United States Patent
Huff et al.

(10) Patent No.: US 11,927,281 B1
(45) Date of Patent: Mar. 12, 2024

(54) PIEZOELECTRICALLY-ACTUATED MICROVALVE DEVICE AND METHOD OF FABRICATION

(71) Applicant: CORPORATION FOR NATIONAL RESEARCH INITIATIVES, Reston, VA (US)

(72) Inventors: Michael A. Huff, Oakton, VA (US); Mehmet Ozgur, Reston, VA (US)

(73) Assignee: Corporation for National Research Initiatives, Reston, VA (US)

( * ) Notice: Subject to any disclaimer, the term of this patent is extended or adjusted under 35 U.S.C. 154(b) by 0 days.

(21) Appl. No.: 17/858,041

(22) Filed: Jul. 5, 2022

(51) Int. Cl.
*F16K 99/00* (2006.01)

(52) U.S. Cl.
CPC ...... *F16K 99/0048* (2013.01); *F16K 99/0015* (2013.01); *F16K 2099/0073* (2013.01); *F16K 2099/0078* (2013.01)

(58) Field of Classification Search
CPC ............. F16K 99/0048; F16K 99/0015; F16K 2099/0073; F16K 2099/0078
USPC .......... 137/11, 831, 487.5, 859, 565.16, 883, 137/884; 422/502, 503, 70, 114, 166
See application file for complete search history.

(56) References Cited

U.S. PATENT DOCUMENTS

| | | | | |
|---|---|---|---|---|
| 6,142,444 A * | 11/2000 | Kluge | ................. | F15C 5/00 137/831 |
| 7,217,395 B2 * | 5/2007 | Sander | ................. | F04B 43/046 347/68 |
| 9,646,878 B2 * | 5/2017 | Huff | ................. | H01L 21/76838 |
| 10,323,772 B2 * | 6/2019 | Huff | ................. | F16K 99/0025 |
| 11,326,717 B1 * | 5/2022 | Huff | ................. | F16K 99/0015 |
| 2004/0119038 A1 * | 6/2004 | Crockett | ............. | F16K 99/0001 251/63.5 |
| 2008/0296523 A1 * | 12/2008 | Gianchandani | ..... | F16K 99/0001 251/368 |
| 2020/0139368 A1 * | 5/2020 | Mou | ................. | F04B 53/1072 |
| 2020/0140264 A1 * | 5/2020 | Mou | ................. | B81C 1/00071 |
| 2020/0326010 A1 * | 10/2020 | Duqi | ................. | F16K 31/005 |
| 2021/0296567 A1 * | 9/2021 | Mou | ................. | H10N 30/02 |
| 2022/0109097 A1 * | 4/2022 | Shabanian | ............. | F04B 53/22 |
| 2023/0102861 A1 * | 3/2023 | Huff | ................. | H01L 21/31111 438/703 |

* cited by examiner

*Primary Examiner* — Minh Q Le
(74) *Attorney, Agent, or Firm* — Nixon & Vanderhye, P.C.

(57) ABSTRACT

A three-way (3-way) Micro-Electro-Mechanical Systems (MEMS)-based micro-valve device and method of fabrication for the implementation of a three-way MEMS-based micro-valve that uses a multicity of piezoelectric actuators. The 3-way has a wide range of applications including medical, industrial control, aerospace, automotive, consumer electronics and products, as well as any application(s) requiring the use of three-way micro-valves for the control of fluids. The three-way microvalve device and method of fabrication can be tailored to the requirements of a wide range of applications and fluid types. The microvalve can be used to control fluids at high pressures and provides for low flow resistances when the microvalve is open and has low leakage when closed.

52 Claims, 21 Drawing Sheets

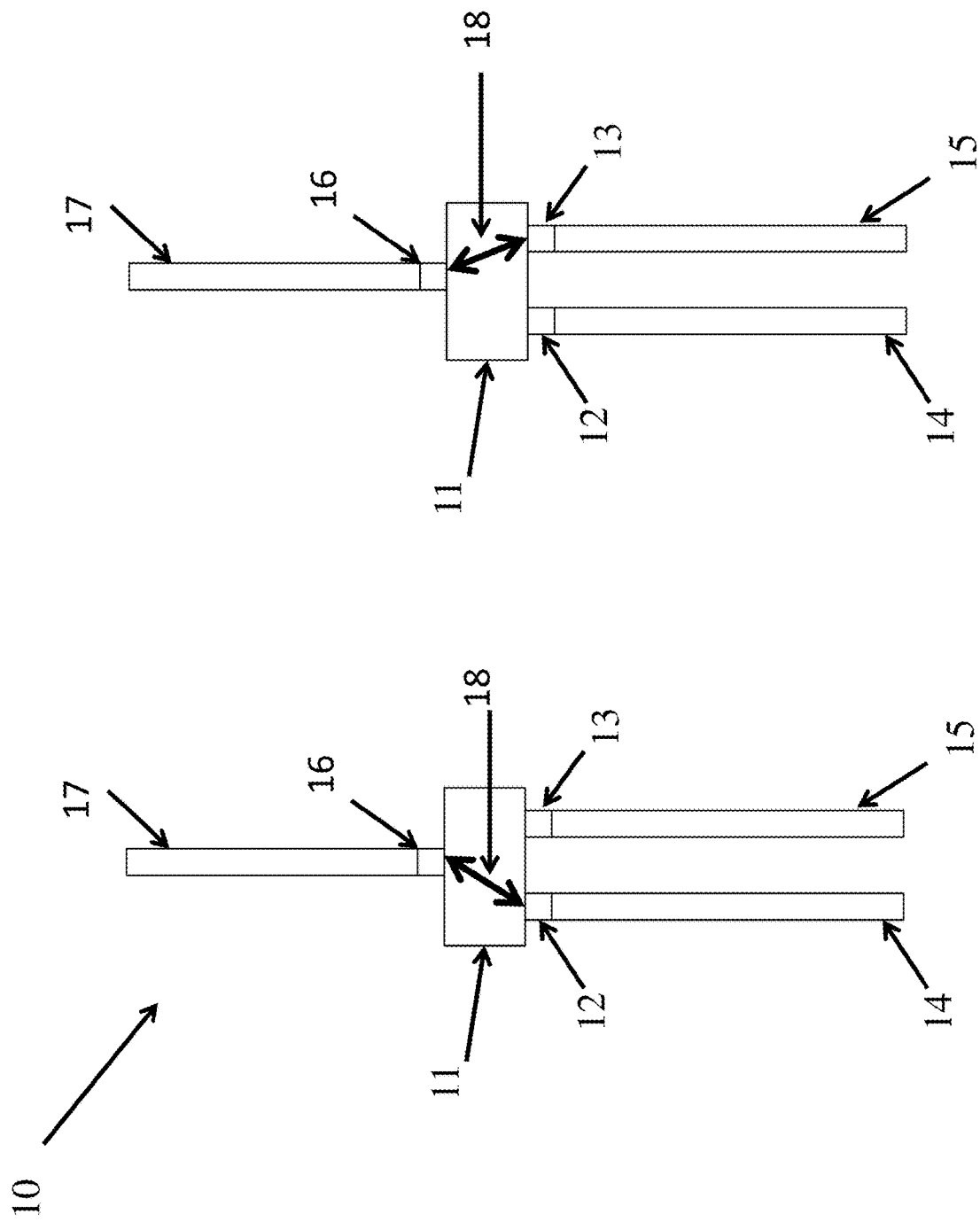

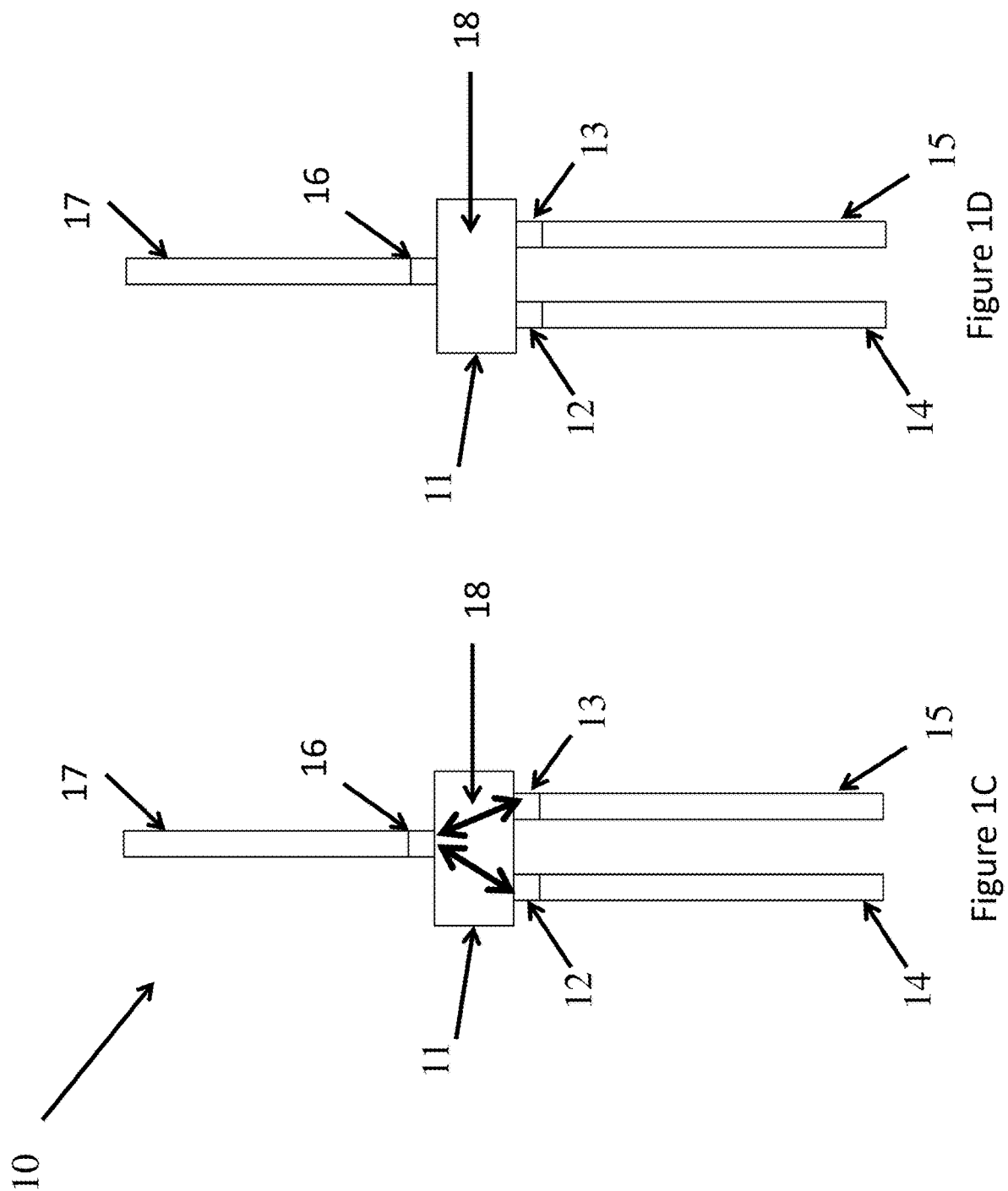

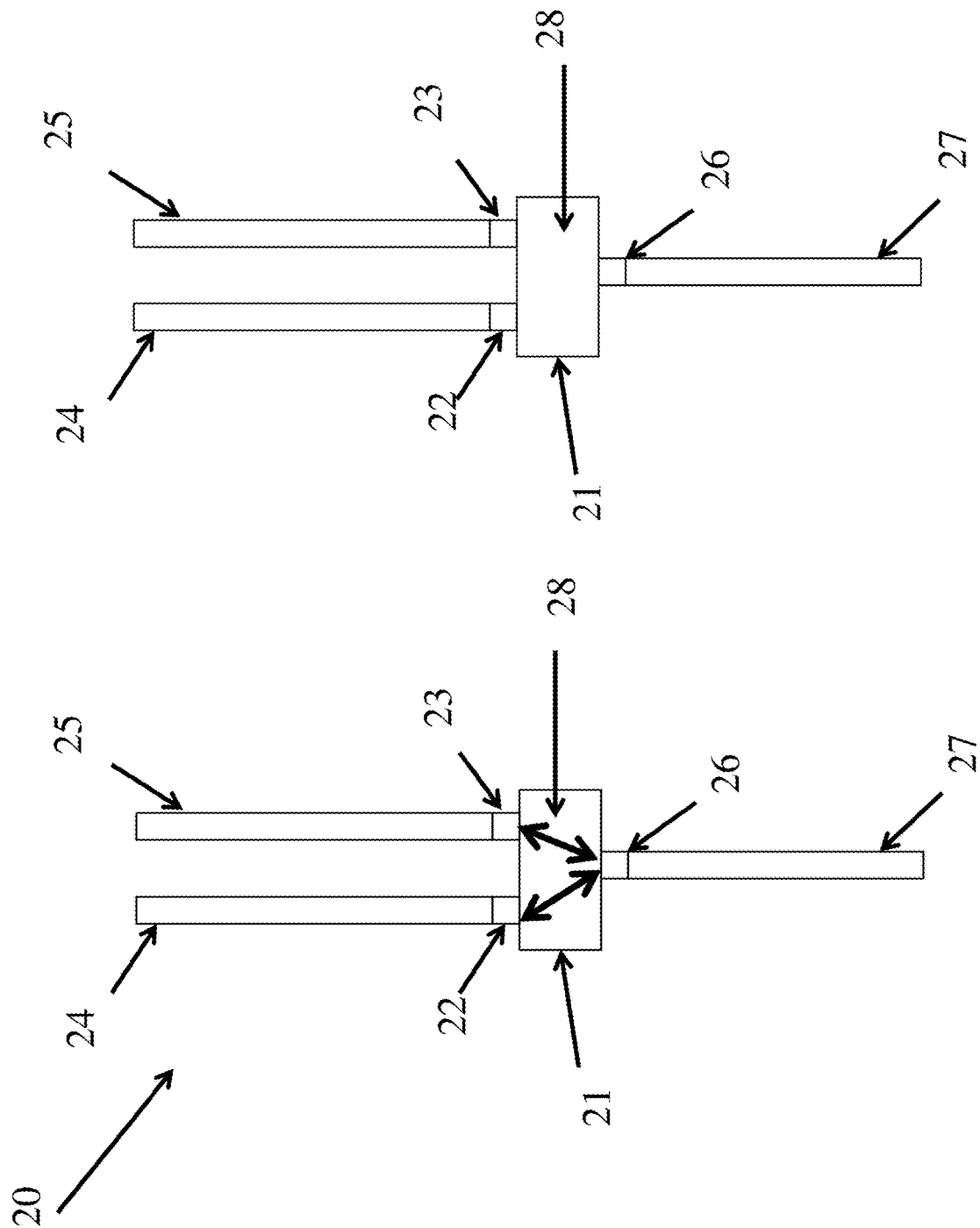

Possible 3-way Microvalve States for 2 inlet ports and 1 outlet port device configuration of Figure 1

| State | Inlet Port 1 | Inlet Port 2 | Outlet Port 3 | Resultant Flow Condition |
|---|---|---|---|---|
| State 1 | on | on | on | Flow from 1 and 2 through 3 |
| State 2 | on | on | off | No flow |
| State 3 | on | off | off | No flow |
| State 4 | off | on | off | No flow |
| State 5 | off | off | off | No flow |
| State 6 | on | off | on | Flow from 1 through 3 |
| State 7 | off | on | on | Flow from 2 through 3 |
| State 8 | off | off | on | No flow |

Figure 3

Possible 3-way Microvalve States for 1 inlet port and 2 outlet ports device configuration of Figure 2

| State | Inlet Port 1 | Outlet Port 2 | Outlet Port 3 | Resultant Flow Condition |
|---|---|---|---|---|
| State 1 | on | on | on | Flow from 1 through 2 and 3 |
| State 2 | on | on | off | Flow from 1 to 2 |
| State 3 | on | off | off | No flow |
| State 4 | off | on | off | No flow |
| State 5 | off | off | off | No flow |
| State 6 | on | off | on | Flow from 1 through 3 |
| State 7 | off | on | on | No flow |
| State 8 | off | off | on | No flow |

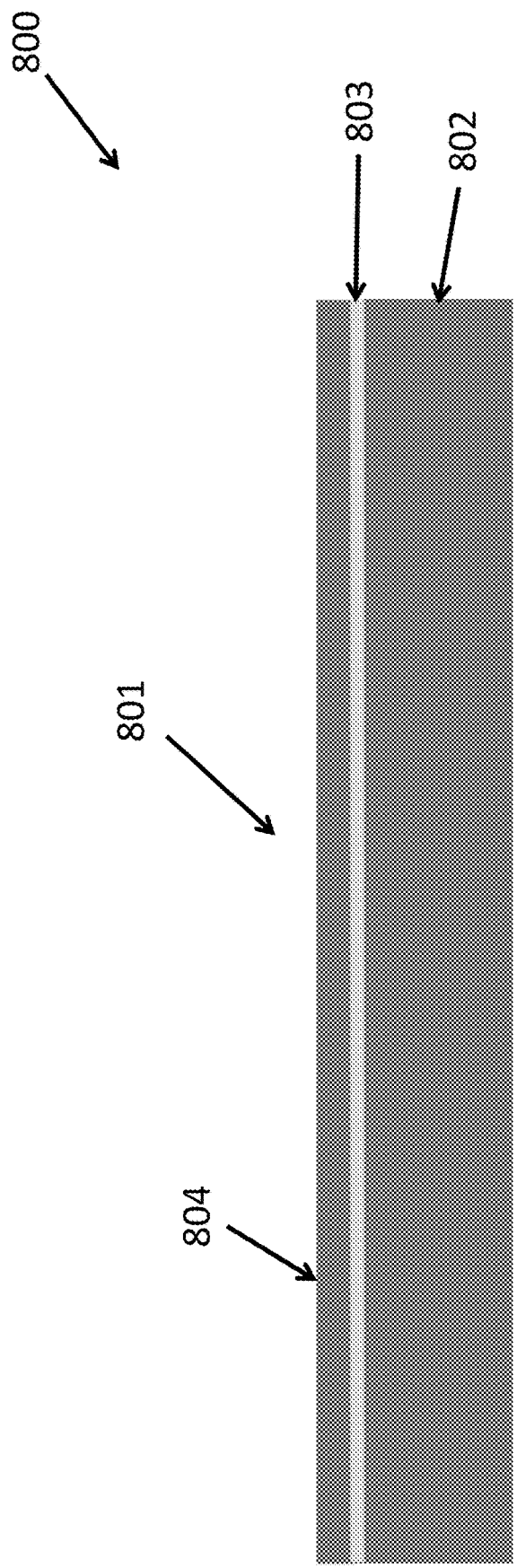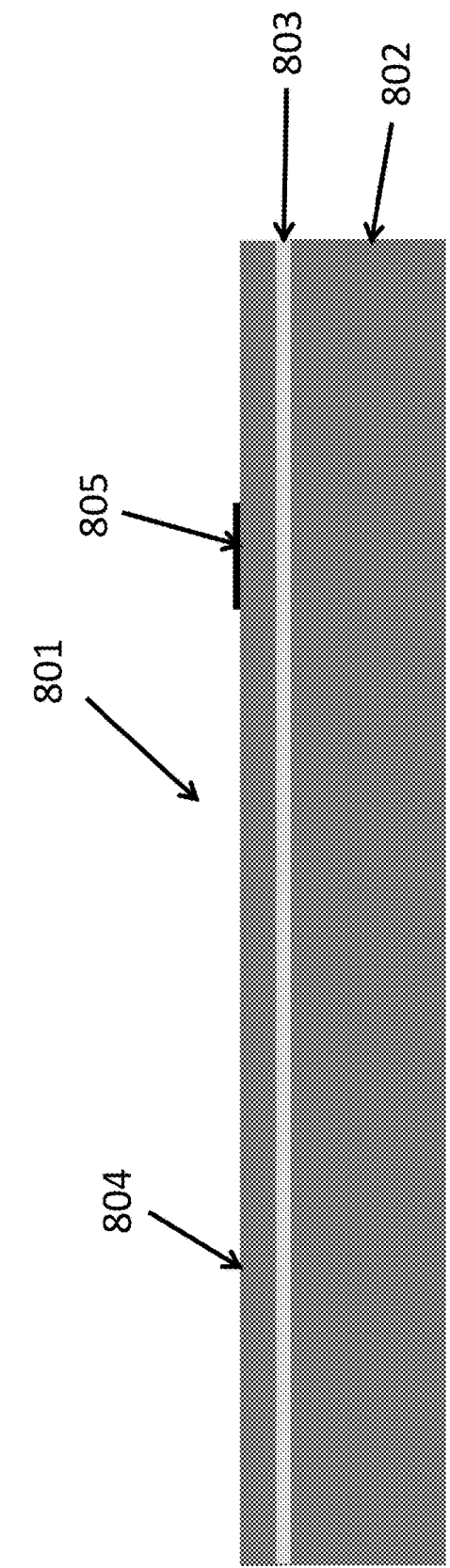
Fig. 6A
Fig. 6B

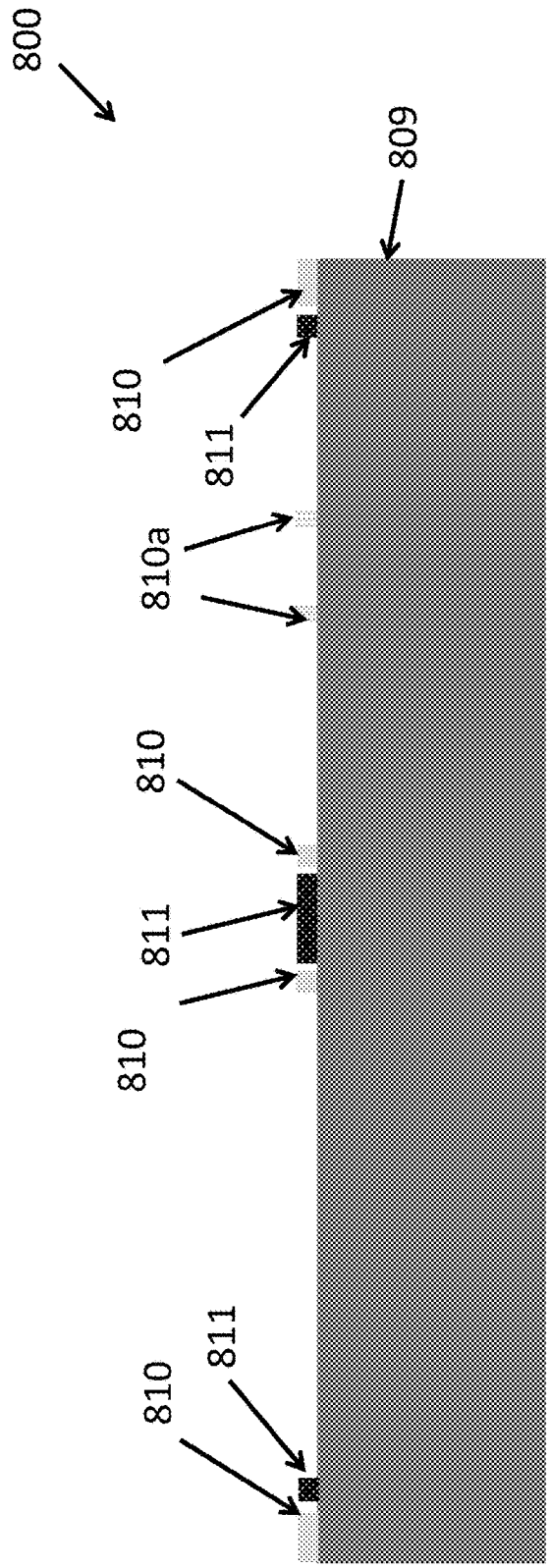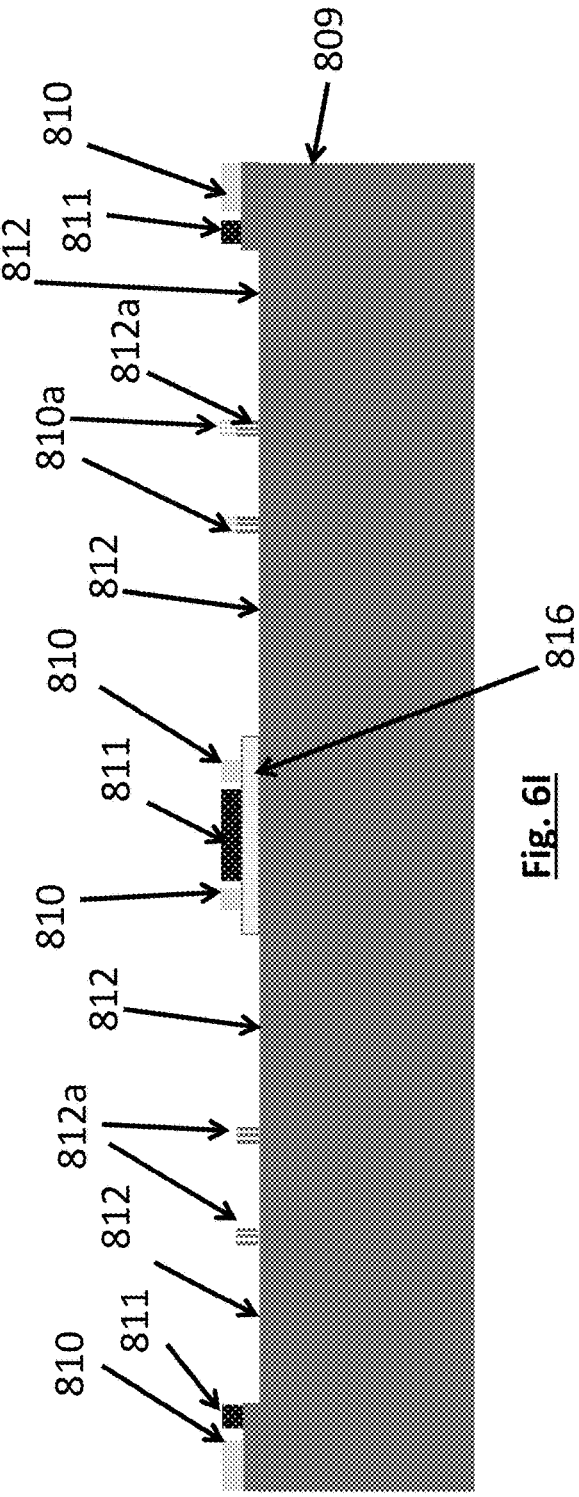

ated under FA8651-16-C-0258 awarded by the Air Force. The government has certain rights in the invention.

PIEZOELECTRICALLY-ACTUATED MICROVALVE DEVICE AND METHOD OF FABRICATION

This invention was made with government support under FA8651-16-C-0258 awarded by the Air Force. The government has certain rights in the invention.

FIELD OF INVENTION

The present invention is directed to a Micro-Electro-Mechanical Systems (MEMS)-based micro-valve devices that employ piezoelectric actuation and methods of fabrication. The present invention uses high force external piezoelectric stacks to actuate the microvalve device. This present invention has a wide range of applications including medical, industrial control, aerospace, automotive, consumer electronics and products, as well as any application(s) requiring the use of three-way micro-valves for the control of fluids.

BACKGROUND

A number of MEMS-based microvalves have been reported in the literature using a variety of actuation methods including: pneumatic (see e.g., L. Yobas, F. Lisy, R. Schmidt, M. Huff, "A Pneumatically Actuated Tactile Display Unit Utilizing MEMS Microvalves," 1998 Annual Meeting of the Biomedical Engineering Society, Rehabilitation Engineering Scientific Track, Session on Sensory Aids and Communication, Cleveland Ohio, Oct. 10-13, 1998); electrostatic (see e.g., M. A. Huff, J. R. Gilbert, and M. A. Schmidt, "Flow Characteristics of a Pressure-Balanced Microvalve," The IEEE 7th International Conference on Solid-State Sensors and Actuators, Transducers 93, Yokohama Japan, Jun. 7-10, 1993; L. Yobas, F. Lisy, and M. A. Huff, "Electrostatically Actuated MEMS Microvalve Suitable for Pneumatically Refreshed Braille-Display-System," Submitted to the American Society of Mechanical Engineers, BioEngineering Conference, June 1999, Big Sky, MT.; L. Yobas, D. Durand, M. Huff, F. Lisy, G. Skebe, "A Novel Integrable Microvalve for Refreshable Braille Display System," IEEE/ASME Journal of MicroElectroMechanical Systems.); thermo-pneumatic (see e.g., Zdeblic, M. J. et al., "Thermopneumatically Actuated Microvalves and Integrated Electro-Fluidic Circuits," Technical Digest of the IEEE Solid State Sensor and Actuator Workshop, Hilton Head, S. C., Jun. 13-16, 1994.); shape-memory alloy (SMA) (see e.g., H. Kahn, W. Benard, M. Huff, and A. Heuer, "Titanium-Nickel Shape-Memory Thin-Film Actuators for Micromachined Valves," Materials Research Society Symposium Proceedings, 444, presented at Fall MRS meeting, December 1996, Boston, MA.; K. Nandakumar, A. Parr, M. Huff, and S. Phillips, "A Smart SMA Actuated Microvalve with Feedback Control," ASME MEMS Conference, November 1998.); thermal bimetallic (see e.g., K. Nandakumar, A. Parr, M. Huff, and S. Phillips, "A Smart SMA Actuated Microvalve with Feedback Control," ASME MEMS Conference, November 1998.); piezoelectric (see e.g., Esashi, M., Shoji, S., and Nakano, A., "Normally Closed Microvalve and Micropump Fabricated on a Silicon Wafer," Proceedings of MEMS '89, 1st International Workshop Micro Electromechanical Systems, Salt Lake City, UT, February 1989.); and electromagnetic (see e.g., Yanagisawa, K., Kuwano, H., Tago, A., "An Electromagnetically Driven Microvalve," Proceedings of the IEEE 7th International Conference on Solid-State Sensors and Actuators, Transducers 93, Yokohama Japan, Jun. 7-10, 1993. February 1989.).

All of these micro-valves previously reported in the literature have been 2-way devices that can merely "open" or close to allow the device to "turn on" or "turn off" the flow of fluid through the structure. Importantly, none of these devices can be operated as three-way microvalves that can direct the flow of fluid in a preferred direction. This is partly due to the fact that MEMS is in general a relatively new technology, and specifically because MEMS-based microvalves are even less mature.

A major challenge for MEMS-based actuators in general, and microvalves in particular, is the very low actuation forces that can be generated on the small dimensional size scales of the actuator elements. The resulting small actuation forces typically prevent these types of devices to be used where the actuator must overcome larger forces. For example, a typical electrostatically-actuated microvalve will only generate less than a 1 psi (pound per square inch) of actuation pressure. Therefore, if the microvalve actuator must overcome the fluid pressure in order to open and/or close the device to the flow of fluid, then the microvalve would be restricted to applications where the fluid pressures are smaller than the actuation pressure, that is less than 1 psi.

Exemplary embodiments disclosed in this application provide for a microvalve device and method of fabrication that can be tailored to the requirements of a wide range of applications, including a 3-way microvalve. The microvalves disclosed herein employ piezoelectric actuation, which can generate relatively high actuation forces compared to other methods of actuation used in MEMS devices. This allows the control of much higher fluid pressures.

The above information disclosed in this Background section is only for enhancement of understanding of the background of the disclosure and therefore it may contain information that does not form prior art.

SUMMARY OF INVENTION

Examples of the present disclosure are directed to a Micro-Electro-Mechanical Systems (MEMS)-based microvalve device and method of fabrication for the implementation of MEMS-based micro-valves. Examples of the present technology have a wide range of applications including medical, industrial control, aerospace, automotive, consumer electronics and products, as well as any application(s) requiring the use of three-way micro-valves for the control of fluids.

A major challenge for MEMS-based actuators in general, and microvalves in particular, is the very low actuation forces that can be generated on the small dimensional size scales of the actuator elements. The resulting small actuation forces typically prevent these types of devices to be used where the actuator must overcome larger forces. For example, a typical electrostatically-actuated microvalve will only generate less than a 1 psi (pound per square inch) of actuation pressure. Therefore, if the microvalve actuator must overcome the fluid pressure in order to open and/or close, then the microvalve would be restricted to applications where the fluid pressures are smaller than the actuation pressure, that is less than 1 psi.

Example embodiment of the present technology allow for the implementation of a microvalve devices and methods of fabrication that can be tailored to the requirements of a wide range of applications and fluid types, including a 3-way microvalve. Exemplary embodiments of a 3-way microvalves disclosed in this application may employ piezoelectric actuation, but can also use a number of different actuation methods including actuation methods to switch the state of the actuator and device from open to closed, or closed to open.

BRIEF DESCRIPTION OF THE DRAWINGS

FIGS. 1A thru 1D illustrate a three-way microvalve with two inlet ports and one outlet port, and showing two functional states of the device.

FIGS. 2A thru 2D illustrate a three-way microvalve with one inlet port and two outlet ports, and showing two functional states of the device.

FIG. 3 is a table showing the possible states of a three-way microvalve having two inlet ports and one outlet port, which may be applicable to the three-way microvalve of FIGS. 1A-1D.

FIG. 4 is a table showing the possible states of a three-way microvalve having one inlet port and two outlet ports, which may be applicable to the three-way microvalve of FIGS. 2A-2D.

FIGS. 6A to 6L are cross sectionals of the substrates at various points in the fabrication.

DETAILED DESCRIPTION

Figure 2B:
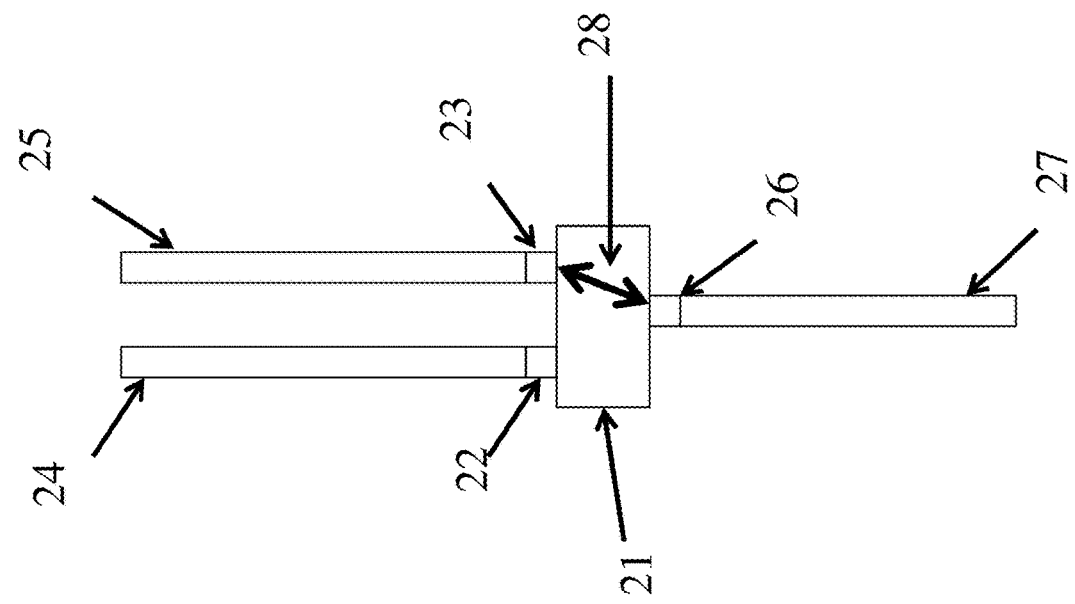

Examples of the present disclosure are directed to Micro-Electro-Mechanical Systems (MEMS)-based micro-valve devices and methods of fabrication for the implementation of a MEMS-based micro-valve. Examples of the present technology have a wide range of applications including medical, industrial control, aerospace, automotive, consumer electronics and products, as well as any application(s) requiring the use of micro-valves for the control of fluids.

The present disclosure allows for the implementation of three-way microvalve devices and methods of fabrication that can be tailored to the requirements of a wide range of applications and fluid types. The three-way microvalves we disclose herein use piezoelectric actuation, but can also use a number of other different actuation methods.

FIGS. 1A to 1D and 2A to 2D illustrate the two types of functionality of the three-way microvalve of the present disclosure. The microvalve has three (3) fluidic ports (openings into or out of the device structure through which fluid [either gas or liquid or a combination of gas and liquids] can flow) with two (2) different microvalve device configurations, with the first device configuration shown in FIGS. 1A to 1D and the second device configuration shown in FIGS. 2A to 2D.

In one microvalve device configuration 10 as shown in FIGS. 1A to 1D, the microvalve device 11 has two inlet fluidic ports, inlet port one, numbered 12, and inlet port two, numbered 13, that are used as inlet ports thereby allowing fluid to flow into the microvalve. That is, fluid can flow into the microvalve device 11 through these inlet ports 12 and 13, through the microvalve 11, and into, and through the remaining port, outlet port three, numbered 16, if these ports are in an "open" state.

Inlet port one, numbered 12, is connected to inlet fluid conduit 14 that is a fluid pathway into inlet port one 12 and the microvalve device 11 in FIGS. 1(a) and 1(b). Outlet port three, numbered 16, is connected to outlet fluid conduit 17 that is a fluid pathway out of the microvalve device 11. Inlet port two, numbered 13, is connected to fluid conduit 15 and is a fluid pathway into inlet port two 13 and the microvalve 11.

The microvalve device 11 shown in FIGS. 1A to 1D has a fluidic switching mechanism 18 whereby either inlet port one, numbered 12, or inlet port two, numbered 13, or both inlet ports 12 and 13, or neither inlet ports 12 and 13 are connected to outlet port three, numbered 16.

This fluidic switching mechanism 18 is shown in the switched states in FIGS. 1A to 1D, with the first switched state illustrated in FIG. 1A wherein inlet port one, numbered 12, is fluidically connected to outlet port three, numbered 16. That is, fluid can flow from conduit 14, through inlet port one 12, through the microvalve 11, through the outlet port 16, and subsequently through conduit 17. In the state shown in FIG. 1A, inlet port two, numbered 13, is not connected to outlet port three, numbered 16. That is, no fluid is allowed from conduit 15, through the inlet port two and into the microvalve 11, and therefore no fluid can flow through conduit 17 from inlet port two 13.

In the second switched state, shown in FIG. 1B, inlet port two, numbered 13, is fluidically connected to outlet port three, numbered 16 by the fluid switch (switching mechanism 18) of the microvalve 11. That is, fluid can flow from conduit 15, through the inlet port two 13, through the microvalve 11, through the outlet port 16, and subsequently through conduit 17. In the state shown in FIG. 1B, inlet port one, numbered 12, is not connected to outlet port three, numbered 16. That is, no fluid is allowed from conduit 14, through the inlet port one and into the microvalve 11, and therefore no fluid can flow through conduit 17 from inlet port one 12.

In FIG. 1C, both inlet ports 12 and 13 are connected to the outlet port 16 and fluid can flow through fluid inlet conduits 14 and 15 to inlet ports 12 and 13, respectively, though the microvalve, and outward through the outlet port 16 through the outlet conduit 17. The switching mechanism 18 for the microvalve in this configuration allows fluid from both inlet ports 12 and 13 to pass through the microvalve and through the outlet port 16.

In FIG. 1D, the inlet ports 12 and 13 are closed to the flow of fluid through the microvalve 11 since the switching mechanism 18 for the microvalve 11 is closed.

In the second device configuration, as shown in FIGS. 2A to 2D, the microvalve device 21 has one inlet fluidic port, inlet port one, numbered 26, that fluid can flow into the microvalve device 21 through this inlet port 26. There are two outlet fluidic ports, with outlet port one numbered 22, and outlet port two numbered 23. These outlet ports 22 and 23 are used as outlet ports 22 and 23 whereby fluid can flow out of the microvalve device 21 that entered through inlet port one 26. Inlet port 26, is connected to inlet fluid conduit 27 that is a fluid pathway into the microvalve device 21. Outlet port 22, is connected to outlet fluid conduit 24 that is a fluid pathway out of the microvalve device 21. Outlet port 23, is connected to outlet fluid conduit 25 that is a fluid pathway out of the microvalve device 21.

The microvalve device 21 shown in FIGS. 2A to 2D has a switching mechanism 28 whereby the inlet port, numbered 26, is either connected to either outlet port 22, or outlet port 23, of both outlet ports 22 and 23, or neither outlet ports 22 and 23.

Figure 2A:
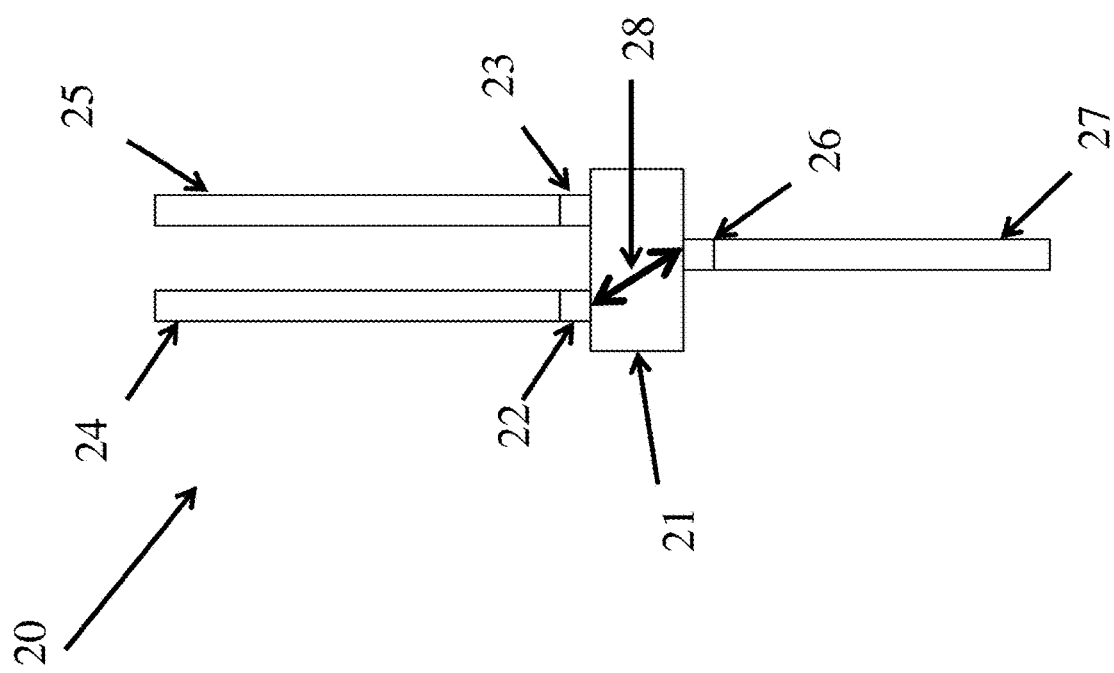

This switching mechanism 28 is shown in the first switched state illustrated in FIG. 2A wherein the inlet port, numbered 26, is fluidically connected to outlet port one, numbered 22. That is, fluid can flow from conduit 27, through the inlet port 26, through the microvalve 21, through the outlet port one 22, and subsequently through conduit 24. In the state shown in FIG. 2A, the inlet port, numbered 26, is not connected to outlet port two, numbered 23. That is, no fluid is allowed from conduit 27, through the microvalve 21, and through conduit 25.

In the second switched state shown in FIG. 2B, the inlet port, numbered 26, is fluidically connected to outlet port two, numbered 23, by the microvalve 21 switch mechanism 28. That is, fluid can flow from conduit 27, through the inlet port 26, through the microvalve 21, through the outlet port two 23, and subsequently through conduit 25. In the state shown in FIG. 2B, inlet port one, numbered 26, is not connected to outlet port one, numbered 22. That is, no fluid is allowed from conduit 27, through the microvalve 21, and through conduit 24.

In FIG. 2C, the outlet ports 24 and 25 are connected to the inlet port 26 and fluid can flow through fluid inlet conduit 27 to inlet port 26, though the microvalve 21, and outward through the outlet ports 22 and 23, and through the outlet conduits 24 and 25. The switching mechanism 18 for the microvalve in this configuration allows fluid from the inlet port 26 to pass through the microvalve 21 and through both outlet ports 24 and 25.

In FIG. 1D, the inlet port 26 is closed to the flow of fluid through the microvalve 21 and into the outlet ports 22 and 23 since the switching mechanism 28 for the microvalve 21 is closed.

In general, the 3-way microvalve of the device configuration of FIGS. 1A to 1D, with two inlet ports and one outlet port, will have several possible states as shown in the table 30 of FIG. 3 depending on which of the inlet and outlet ports are either in an "on" or "off" state.

Similarly, the 3-way microvalve of the device configuration of FIGS. 2A to 2D, with one inlet port and two outlet ports, also has several possible states as shown in the table 40 of FIG. 4 depending on which of the inlet ports and outlet port are either in an "on" or "off" state.

It is important to note that valves in general, and microvalves in particular, may not exhibit all of these states shown in FIGS. 3 and 4. The ability for these devices to exhibit specific states is dependent on the specific design of the device, method of actuator, as well as other factors. Nevertheless, as noted above, many of the states are redundant (e.g., the no flow states) or have no particular interest in applications and therefore the ability of a microvalve device to exhibit less than all possible states is not limiting in most applications.

Another differentiating element of 3-way microvalves is whether they are "normally open" or "normally closed." "Normally open" and "normally closed" describe the state or position of the valve when no actuation signal is applied to the device. That is, the natural or resting state of the device when no electrical power is applied to the device's actuator. Typically, a "normally closed" device would employ some kind of spring or mechanical force that results in the valve port or ports being closed when no power is applied to the microvalve actuator. Conversely, a "normally open" microvalve's ports are open when no power is applied. Whether the microvalve is normally "open" or normally "closed" will depend on the exact design of the microvalve as well as the application requirements. The 3-way microvalves of the present disclosure can be implement in both the "normally open" or "normally closed" device configurations.

Typically, the actuation method employed in any microvalve design is dictated by the requirements of the intended application. Typically these requirements would include: maximum flow rate, maximum pressure differential, operating temperatures, electrical power; size and weight; type of fluid to be controlled; as well as other factors.

Often a criterion (which may be important in some applications) for selection of actuation method is the power requirements for the specific application. For example, for some applications the heating requirements of thermal-actuation methods may exceed the device power requirements.

Additionally, pneumatic actuation approaches wherein an external pressure generator is required to provide pressures to actuate the device will increase the size (and power requirements) of the device considerably. Therefore, for some applications pneumatic actuation may not be an optimal approach.

Electromagnetic actuation is a popular method of actuation in macro-scale valves, but this type of actuation does not scale well to the MEMS size domain. Many MEMS-based electromagnetic actuation schemes require a meso-scale electromagnetic solenoid that must be attached to the valve mechanism and this increases the cost and size of the system considerably and therefore this actuation method may not be desirable for some applications. Alternatively, some MEMS-based electromagnetic actuation schemes attempt to integrate wire windings into the device structure, but this makes the fabrication very challenging and the maximum current that can be safely passed through small wires often limits the electromagnetic forces that can be generated using this approach.

Electrostatic and piezoelectric actuation methods are often employed for microvalve devices. However, it is important to note that both of these approaches have small inherent strokes. That is, the amount of deflection of the actuator during actuation is relatively small. The resultant effect of a small stroke of the microvalve is that the fluid flow pressure through the opening will be high in order to flow resistance created by the small stroke and therefore this may limit the amount of fluid flow through the device when in an "open" state.

In the case of piezoelectric actuation, the issue of small actuator displacement, or stroke, can be overcome to some degree by using a stacked piezoelectric actuator. This is one approach taken in the example embodiments that are described below. According to some examples of the present technology, the stacked piezoelectric actuators may be configured to generate larger displacements and thereby larger strokes in the microvalve mechanism resulting in lower fluidic losses, and/or generate larger forces to open and close the microfluidic thereby enabling the control of fluids at higher pressure levels. In some examples, the displacement may be greater than 2 microns, between 2 and 5 microns, or greater than 5 microns. In some examples, the first, second and third actuators are stacked piezoelectric actuators that can control fluid pressures that are more than a few psi (e.g., more than two psi).

Another point about electrostatic actuation is that the actuation energy densities or actuation pressures that can be generated using this actuation method are very small (which may be important in some applications). The consequence of this is that a device using this actuation scheme may not be able to operate, that is actuate to open and/or close, at differential fluid pressures higher than can be generated by the actuator.

Piezoelectric actuation schemes on the other hand, can generate very large actuation energy densities and therefore can be used in applications requiring operation at high differential fluid pressures.

The three-way microvalve devices disclosed herein of the present disclosure can be used with any of the available actuation schemes.

Figure 5A:
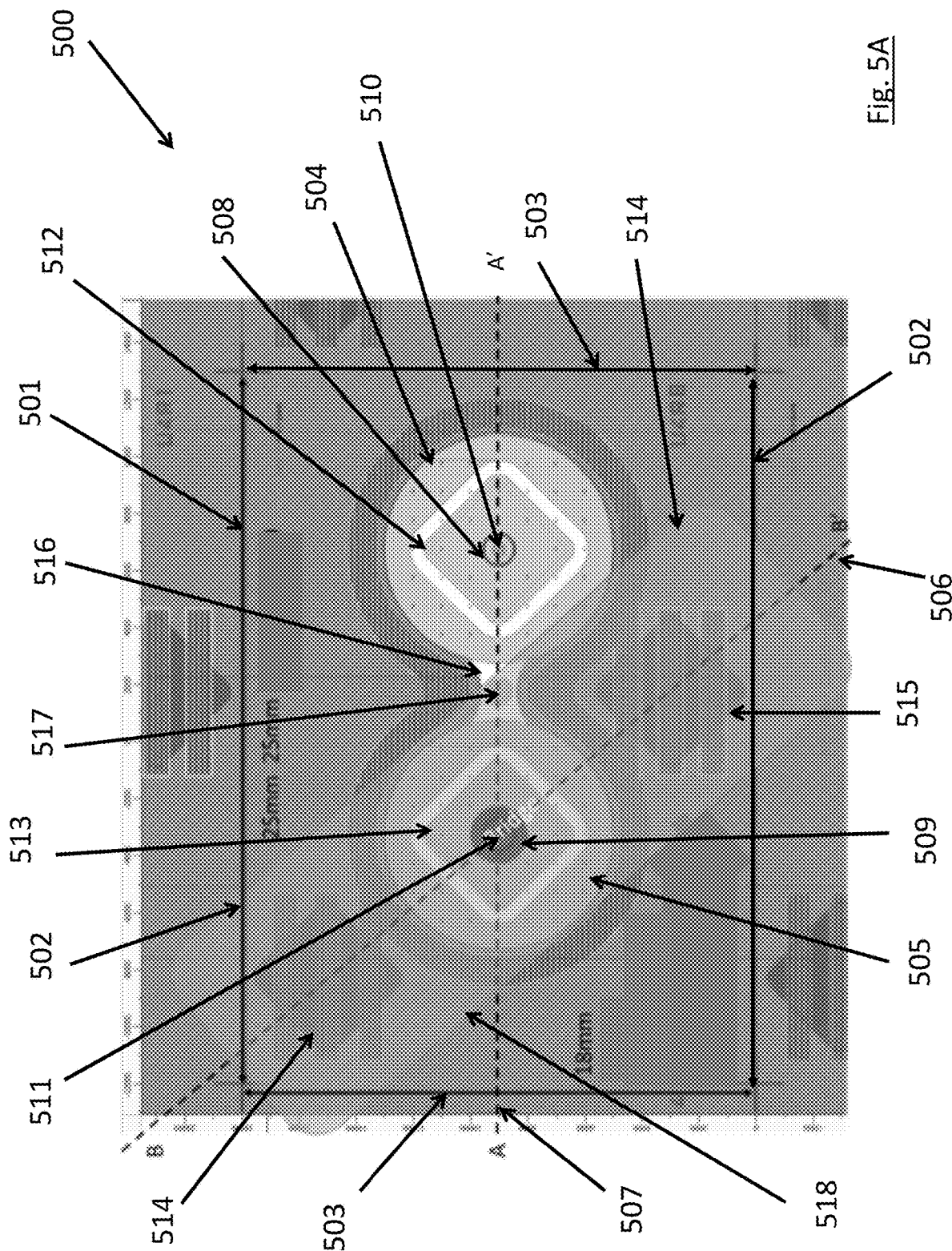
FIG. 5A is a plan view of the microvalve of the present disclosure.
Figure 5B:
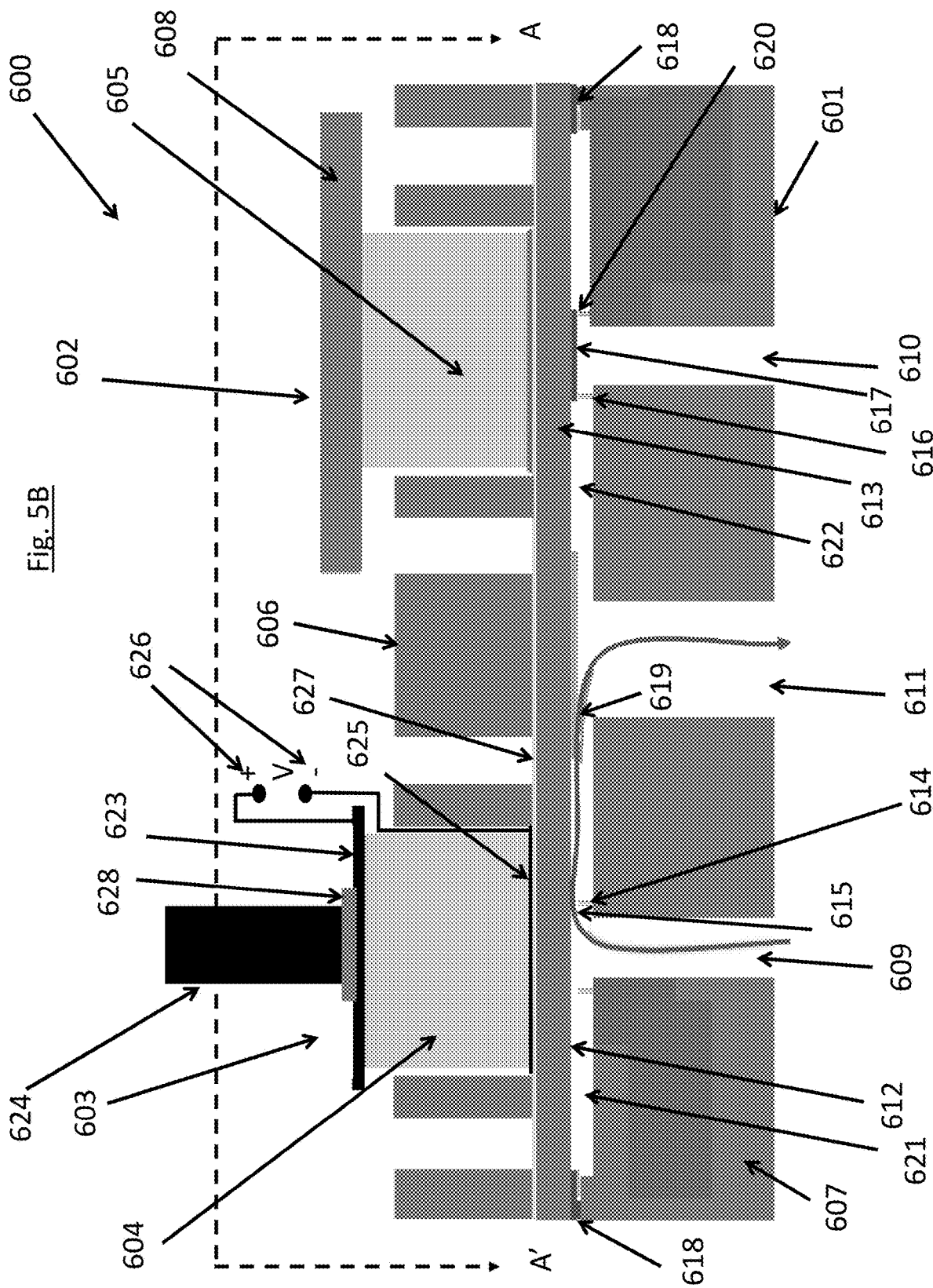
FIG. 5B is a cross-sectional view of the microvalve of the present disclosure along the line of A' to A in FIG. 5A.
Figure 5C:
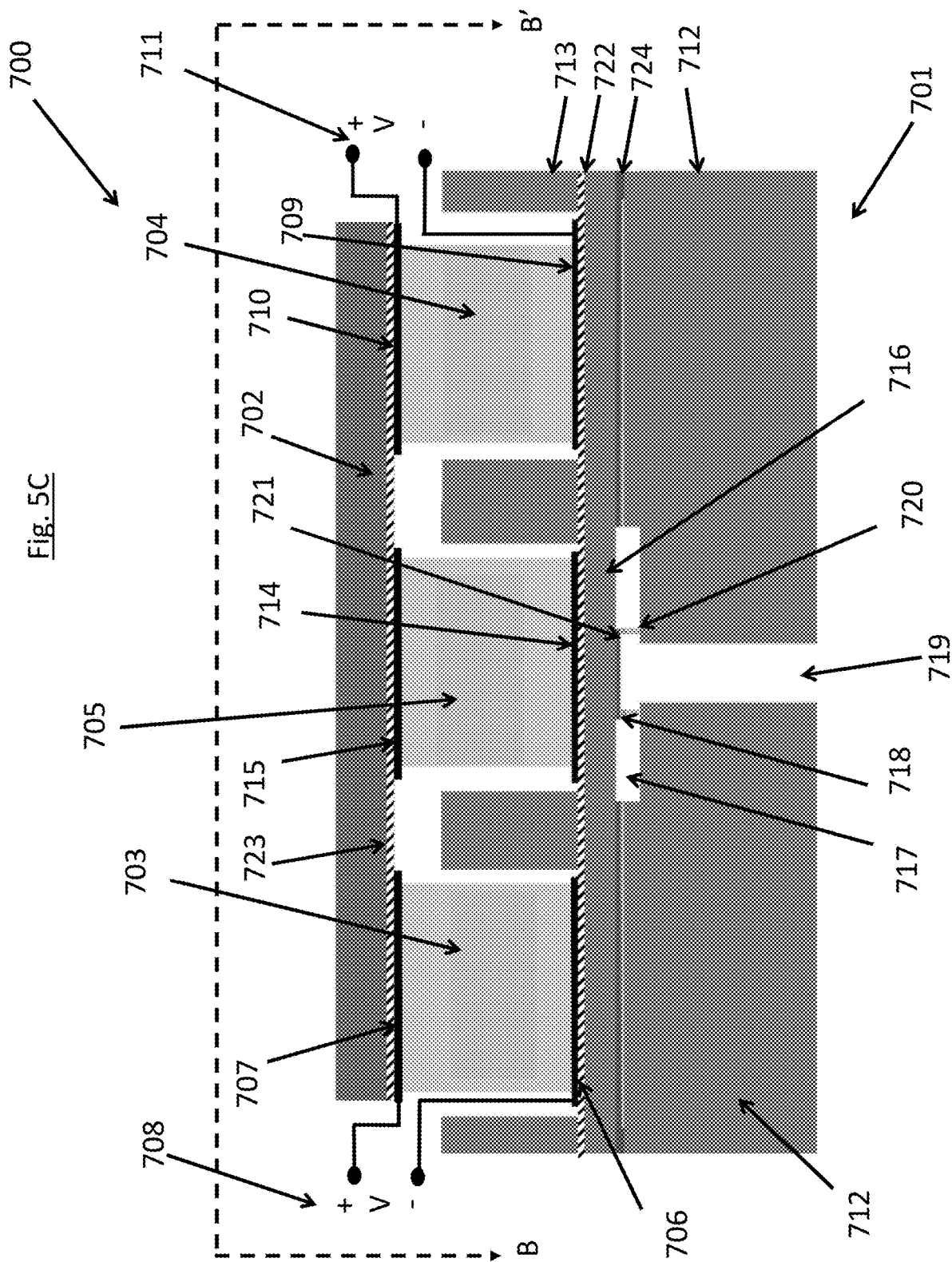
FIG. 5C is a cross-sectional view of the microvalve of the present disclosure along the line of B to B' in FIG. 5B.

An exemplary embodiment of a three-way microvalve 500 is shown in FIGS. 5A, 5B and 5C. The three-way microvalve 500 shown in FIGS. 5A, 5B, and 5C is piezoelectrically-actuated as described herein.

The microvalve 500 of FIGS. 5A, 5B, and 5C uses externally-made piezoelectric stack actuators that are attached to the microvalve plunger plates. The use of piezoelectric stacked actuators allows large displacements of the microvalve plunger plates thereby enabling the fluid flow resistance to be lowered. The piezoelectric actuators also generate large forces that can be used to control fluids at higher pressures.

The microvalve 500 shown in FIG. 5A is a plan view of the microvalve die 501. The microvalve device die 501 is bordered in the x-direction 502 and y-direction 503 and can measure, by way of example, 25 mm in the x-direction 502 and 18 mm in the y-direction 503. There are two major components to embody the 3-way microvalve device 501 functionality, one component is composed of a normally-open device (microvalve component 504 on the right side of FIG. 5A) that uses a single piezoelectric actuator 512, and the second component is composed of a normally-closed device (microvalve component 505 on the left side of FIG. 5A) and uses two piezoelectric actuators 514 and 515 and a non-active spacer element 513 that can be composed of a piezoelectric actuator that is non-electrically active or any suitable material that can act as a spacer element 513. The device component on the right (microvalve component 504) has an inlet (or outlet) 510 to allow fluid to enter (or exit) the device (e.g., microvalve component 504) chamber that is surrounded by sealing rings or surfaces 508. The device component on the left (microvalve component 505) has an inlet (or outlet) 511 to allow fluid to enter (or exit) the device (e.g., microvalve component 505) that is surrounded by sealing rings or surfaces 509. The sealing rings or surfaces 508 may be provided adjacent and/or around the fluid ports so that device has better sealing properties and is less prone to stiction effects.

There is a fluidic connection between the two microvalve components 504 and 505 that is composed of a microfabricated channel 516 between the chambers of the two microvalve components 504 and 505 that allows fluid to pass from the two microvalve components 504 and 505. There is located an outlet (or inlet) 517 to the channel 516 that allows fluid to exit (or enter) the device channel 516.

There are two cross-sectional lines placed onto the microvalve die 501 wherein one is labeled A and A' 507 that is approximately halfway intersecting the microvalve die 501 in the y-direction and other is labeled B and B' 506 that is approximately at a 45-degree angle to the microvalve component 505 on the left side of the microvalve die 501. Shown in partial transparent mode (since it would block being above to see other components below it) is a bridge element 518 that is used to mechanically connect the two active piezoelectric actuators 514 and 515 to the center spaced element 513.

These cross-sections will be used in FIGS. 5B and 5C to further describe the microvalve device 501.

FIG. 5B is an embodiment 600 cross section of the microvalve device 601 along line A' to A in FIG. 5A. It should be noted that the cross section is A' to A and therefore has been mirror-imaged in the x-direction compared to 5A. The normally-open component 603 of the microvalve 601 is shown on the left side of FIG. 5B and the normally-closed component 602 of the microvalve 601 is shown in the right of FIG. 5B.

The normally-open component 603 of the microvalve 601 has a stacked piezoelectric actuator 604 that is attached to a bottom electrode 625 located on an insulator layer 627 that is positioned on a movable membrane 612. Another electrode 623 is placed onto the top of the stacked piezoelectric actuator 604. The two electrodes 623 and 625 on either side of the stacked piezoelectric actuator 604 are connected to an applied voltage source 626 that is used to actuate the stacked piezoelectric actuator 604.

The normally-open component 603 of the microvalve 601 has a mechanically moveable membrane 612 that can move up and down to open and close the flow path 615 to prevent fluid from flowing through the gap between the top of the sealing rings or surfaces 614 and the bottom surface of the movable membrane 612.

The movable membrane 612 is moved or displaced by the stacked piezoelectric actuator 604 attached to the bottom movable electrode 625 and the moveable membrane 612. The un-activated position of the normally-open component 603 of the microvalve 601 is shown in FIG. 5B wherein no electrical voltage 626 is applied to the stacked piezoelectric actuator 604 and therefore the stacked piezoelectric actuator 604 is not elongated as would be the case when an electrical voltage 626 were applied to the stacked piezoelectric actuator 604. When a voltage 626 is applied to the stacked piezoelectric actuator 604, it will elongate, that is, the length of the stacked piezoelectric actuator 604 will increase, and since the actuator 604 is attached to the top electrode 623 having an insulator 628 on top and then joined to a fixed unmovable support 624, the result is that the stacked piezoelectric actuator 604 applies a force to the top surface of the movable membrane 612 thereby causing it to displace downward. With a sufficiently high electrical voltage 626 applied to the stacked piezoelectric actuator 604, it will displace the movable membrane 612 sufficiently downward so that the bottom surface of the movable membrane 612 contacts the sealing rings or surfaces 614 located around the fluid inlet (or outlet) 609 of the normally-open component 603 of the microvalve 601. This changes the state of the normally-open component 603 of the microvalve 601 from an "open state" to a "closed state" wherein "opens state" refers to the normally-open component 603 of the microvalve being open to the fluid flow path 615 through the inlet (or outlet) 609 of the device, through the device and the fluid chamber 621, through the flow channel 619, and then outward (or inward) through the outlet (or inlet) 611 of the microvalve 601. When the applied electrical voltage 626 is removed or turned off, the stacked piezoelectric actuator 604 returns to its un-elongated position and the force against the moveable membrane 612 goes to zero, and the movable membrane 612 returns to its un-displaced position.

The normally-open component 603 of the microvalve 601 has an inlet (or outlet) 609 to allow fluid to enter (or exit) the normally-open component 603 of the microvalve 601. The normally-open component 603 of the microvalve 601 has an internal chamber 621 that is circularly symmetric and sealing rings or surfaces 614 that contact and seal against the moveable membrane 612 when the normally-open component 603 of the microvalve is closed, and this occurs when the piezoelectric actuator 604 is activated by an applied voltage 626 (not shown in FIG. 5B). When the normally-open component 603 of the microvalve 601 is open to fluid flow 615 (as shown by the curved line with an arrow at the end), the fluid flows 615 through the inlet (or outlet) 609, across the gap between the sealing rings or surfaces 614 and the bottom surface of the movable membrane 612, through the chamber 621 and through the micromachined channel 619 and outward (or inward) through the outlet (or inlet) 611.

The normally-closed component 602 of the microvalve 601 has an inactive spacer element 605 that is mechanically connected to the other two active stacked piezoelectric actuators (not shown in FIG. 5B) using a bridge element 608.

The normally-closed component 602 of the microvalve 601 also has a mechanically moveable membrane 613 that can move up and down to open and close the flow path 620 (Note: the normally-closed component 602 of the microvalve 601 is shown in FIG. 5B as closed to the flow of fluid). The normally-closed component 602 of the microvalve 601 also has a circularly symmetric fluid chamber 622, an inlet (or outlet) 610 for fluid to flow inward (or outward), and sealing rings or surfaces 616 that make physical contact to a mechanical biasing layer 617 positioned on the bottom surface of the movable membrane 613 so as to block the flow of fluid through the component (piezoelectric actuator 612). The operation of the normally-closed component 602 of the microvalve 601 will be more fully described in FIG. 5C.

The top portion 606 of the microvalve 601 is composed of a micromachined substrate that is bonded to a bottom micromachined substrate 607 to form the microvalve 601. Spacer layers 618 composed of one or more thin-film layers are fabricated so that the surfaces that can block the flow of fluid are in physical contact.

FIG. 5C is an embodiment 700 cross section of the normally-closed component of the microvalve device (normally-closed component 701) along line B to B' in FIG. 5A. The normally-closed component of the microvalve device 701 has two electrically-active stacked piezoelectric actuators 703 and 704 and a spacer element 705 in the middle. The stacked piezoelectric actuator 703 on the left is positioned onto a bottom electrode 706 positioned onto an electrically insulating layer 722 on a relatively thick unmovable substrate 712. The stacked piezoelectric actuator 703 on the left has a top electrode 707 positioned on the stacked piezoelectric actuator 703, with an electrically insulating layer 723 on top, and a bridge element 702 on top of the insulating layer 723. The two electrodes 706 and 707 on the bottom and top of the stacked piezoelectric actuator 703 are electrically connected to an applied voltage source 708 that is used to apply a voltage 708 across the stacked piezoelectric actuator 703 to cause it to elongate and thereby actuate it.

The stacked piezoelectric actuator 704 on the right is positioned onto a bottom electrode 709 positioned onto an electrically insulating layer 722 on a relatively thick unmovable substrate 712. The stacked piezoelectric actuator 704 on the right has a top electrode 710 positioned on the stacked piezoelectric actuator 704, with an electrically insulating layer 723 on top, and a bridge element 702 on top of the insulating layer 723. The two electrodes 709 and 710 on the bottom and top of the stacked piezoelectric actuator 704 are electrically connected to an applied voltage source 711 that is used to apply a voltage by voltage source 711 across the stacked piezoelectric actuator 704 to cause it to elongate and thereby actuate.

The spacer element 705 is positioned on an electrode 714, positioned on an insulating layer 722, positioned on a movable membrane 716. The spacer element 705 has a top electrode 715 with an insulating layer 723 on top. A bridge element 702 is located on top of the insulating layer 723. When the electrodes, specifically electrodes 706 and 707 on the stacked piezoelectric actuator 703 on the left and the electrodes 709 and 710 on the stacked piezoelectric actuator 704 on the right have no applied voltages 708 and 711, the stacked piezoelectric actuators 703 and 704 on the left and right are not actuated and do not elongate.

In this state, which is the normally-closed state, the bridge element 702 that mechanically couples the three elements, specifically the stacked piezoelectric actuator 703 on the left, the stacked piezoelectric actuator 704 on the right, and the center spacer element 705 is not displaced vertically and remains in a neutral un-deflected position as shown in FIG. 5C. In this state, the movable membrane 716 bottom surface is in physical contact with the sealing rings or surfaces 720 that are located inside the valve chamber 717 near the inlet (or outlet) port 719 for fluids to enter (or exit) the valve chamber 717. A mechanical biasing surface 721 may be positioned on the underside of the movable membrane 716 to ensure that the sealing rings or surfaces 720 are in actual physical contact with the mechanical biasing surface 721 so as to close the flow channel off from the flow of fluid through the device (normally-closed component 701).

When the electrodes, specifically electrodes 706 and 707 on the stacked piezoelectric actuator 703 on the left and the electrodes 709 and 710 on the stacked piezoelectric actuator 704 on the right have applied voltages 708 and 711, the stacked piezoelectric actuators 703 and 704 on the left and right are actuated and will elongate.

In this state, which is the open state, the bridge element 702 that mechanically couples the three elements, specifically the stacked piezoelectric actuator 703 on the left, the stacked piezoelectric actuator 704 on the right, and the center spacer element 705 are displaced vertically (not shown in FIG. 5C). In this state, the movable membrane 716 bottom surface is no longer in physical contact with the sealing rings or surfaces 720 that are located inside the valve chamber 717 near the inlet (or outlet) port 719 and fluid can enter (or exit) the valve port 719, flow through the channel created between the sealing rings or surfaces 720 and the bottom on the movable membrane 716, and then through the valve chamber 717. The fluid would then enter the central fluid channel 619 shown in FIG. 5B and outward (or inward) through the outlet (or inlet) port 611 as shown in FIG. 5B.

The normally-closed component 701 of the microvalve is actuated by the two stacked piezoelectric actuators 703 and 704 on the left and right sides of the structure in embodiment 700 shown in FIG. 5C. These stacked piezoelectric actuators 703 and 704 elongate when voltages 708 and 711 across their electrodes 706 and 707 for the stacked piezoelectric actuator 703 on the left and electrodes 709 and 710 for the stacked piezoelectric actuator 704 on the right. The two stacked piezoelectric actuators 703 and 704 are mechanically coupled to the bridge element 702 that it mechanically rigid (it does not flex appreciably) and the bridge element 702 is also mechanically coupled to the center spacer element 705. Therefore, when the two stacked piezoelectric actuators 703 and 704 are activated and elongate, the bridge element 702 displaces vertically and thereby places a force on the center spacer element 705 causing it to displace vertically thereby opening the inlet (or outlet) port 719 to the flow of fluid.

It is preferable that the vertical heights of each of the two stacked piezoelectric actuators 703 and 704 and the spaced element 705 have all nearly the same dimensions. In some embodiments, it may be preferable to use another (third) stacked piezoelectric actuator in place on the spacer element 705.

Additionally, the normally-closed component 701 of the microvalve is implemented by bonding of a top micromachined substrate 713 with membrane layer 716 to a bottom micromachined substrate 712. The bonding interface is composed of one or more thin-film layers 724 that provide for the correct separate between the bonded substrates 713 with layer 716 to 712 as well as sufficient bonding strength.

The piezoelectric actuators used in the present embodiment are composed of stacks of piezoelectric layers to form single actuator elements wherein the layers in the stacked are configured so that the elongation of the entire stack with the application of a suitable voltage signal can result in relatively large displacements. Displacement amounts of 9 to 10 microns can be achieved with stacked piezoelectric actuators having heights of 8 to 10 mm. Moreover, the blocking forces, which are representative of the force levels that the stacked piezoelectric actuators exhibits can be as large as 380 N for an element having an area of 3 mm by 3 mm. Larger force levels can be obtained for piezoelectric actuators having larger areas. The voltage levels sufficient to cause these actuators to fully extend are about 60 to 65 Volts. The force levels generated by these piezoelectric actuators are sufficient to control fluids at very high pressures. Additionally, the actuation distances exhibited by these piezoelectric actuators allows for a very low fluidic resistance to be obtained. Specifically, using these stacked piezoelectric actuators in the microvalve design disclosed herein it is possible to obtain displacements of 10 microns or more between the sealing rings or surfaces and the membrane during actuation thereby resulting in a very low flow resistance for liquids, gases, or mixed phased systems. Further, these types of actuators used in the present embodiment also are able to control fluids at pressure of several hundred to several thousand pounds-per-square-inch (psi). Specifically, the microvalve can be used to control fluids at pressures of 300 psi or less and with use of other actuators in the same design can be used to control fluids from 300 psi to 3000 psi or more.

The method of fabrication 800 of the 3-way microvalve will now be described (see FIGS. 6A-6K). While operations are shown in a specific order, one or more of the operations may be omitted, substituted by another operations, moved and/or repeated. The method of fabrication will be described with the illustrative aid of cross-sectional drawings of the substrate at major steps along the process sequence. It should be recognized that the dimensions of these drawings are not to scale and are merely provided to illustrate how the various layers involved in the fabrication are implemented.

The process begins with a starting substrate 801 that is of the type called "silicon-on-insulator (SOI)" as shown in FIG. 6A. An SOI substrate 801 is composed of a handle substrate 802 on the bottom made of single-crystal silicon, usually 400 microns or more in thickness; a buried silicon dioxide layer 803 on the top surface of the handle substrate; and a device layer 804 that is also made of single-crystal silicon. In one example of the present embodiment, the SOI substrate 801 is 100-mm in diameter, the handle substrate 802 has a thickness of 400 microns, the buried oxide layer 803 has a thickness of 0.2 microns, and the device layer thickness can be 50 or 100 microns. Other substrate 801 diameters and thicknesses for the handle substrate 802, buried oxide layer 803 and device layer 804 can be used to implement the device of the present disclosure.

The SOI substrate 801 then has a thin-film layer of silicon nitride 805 deposited onto the top surface of the device layer 804 using plasma-enhanced chemical vapor deposition (PECVD). The silicon nitride layer 805 has a thickness of 1 micron, a residual stress of 600 MPa, a refractive index of 1.985, and is deposited using a silane, ammonia, and nitrogen process gas combination. The silicon nitride layer 805 is deposited at 350-degrees Celsius at a deposition rate of 160 Angstroms/minute in some examples.

The deposited silicon nitride 805 layer has contact photolithography (not shown) performed on it using (mask 1) wherein contact photolithography is well known in the art. Specifically, a photoresist is deposited onto the substrate 801 surface and then exposed using a radiation source through an appropriate mask and then developed into the desired pattern. Mask 1 is aligned to the substrate flat. The photoresist is then usually hard baked so that it has better etch selectivity.

Subsequently, the silicon nitride layer 805 is etched using the photoresist of the photolithography process previously performed as a masking layer. A reactive ion etch (RIE) is performed on the silicon nitride 805 layer. The RIE etch is terminated when the top surface of the device layer 804 of the SOI substrate 801 is cleared of silicon nitride 805 in areas without a masking layer of photoresist. The result of this etch is to leave an area of the silicon nitride 805 that will serve as a mechanical biasing layer for the sealing surfaces of the normally-closed component of the microvalve device. After the RIE etch, the photoresist masking layer is removed from the surface of the SOI substrate 801 (see FIG. 6B).

A thin-film layer of silicon oxy-nitride (SiON) 806 is then deposited using PECVD having a thickness of, for example, 5 microns. The process gases for this deposition are nitrous oxide, silane and helium and the deposition is performed at 350 degrees Celsius. The refractive index of the SiON 1806 layer is 1.456 and the residual stress is 400 MPa compressive.

The deposited SiON 806 layer has contact photolithography (not shown) performed on it using mask 2. The contact photolithography process is well known in the art and is performed similarly to the photolithography performed on the silicon nitride 805 layer, except in this case, the mask (mask 2) for the SiON patterning is aligned to the pattern of mask 1 used to pattern the silicon nitride 805 layer.

Figure 6C:
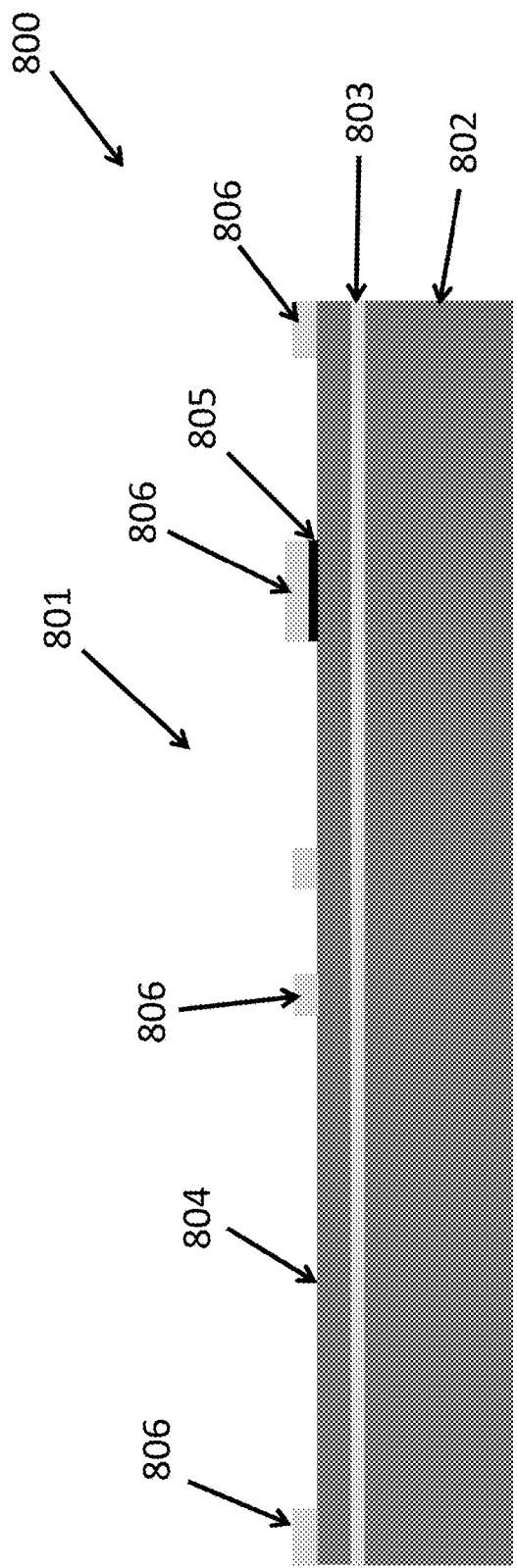

Subsequently, the SiON layer 806 is etched using the photoresist of the photolithography process previously performed as a masking layer. A RIE etch is performed on the SiON 806 layer. The RIE etch is terminated when the top surface of the device layer 804 of the SOI substrate 801 is cleared of SiON 806 in areas without a protective masking layer of photoresist. The result of this etch is to leave an areas of the SiON 806 that will serve as layers to adjust for the correct placement of the microvalve components after a substrate bonding step later in the process sequence is performed. The photoresist masking layer used for RIE etching the SiON 806 layer is then removed and the result is shown in FIG. 6C.

Next, a contact photolithography is performed (mask 3) wherein the photoresist can be 7 microns in thickness. The photolithography process is performed similarly to the other photolithography processes of this process sequence. The mask (mask 3) is aligned to the other two layers already patterned for the silicon nitride 805 and SiON 806. Other thicknesses of photoresist can be used. The photoresist is to be used for a lift-off patterning of a gold thin-film layer that will be deposited subsequently.

After the photoresist has been patterned using the photolithography process and prior to depositing a gold thin-film layer, the exposed surfaces are cleaned of any residues using a photoresist descum process that is composed of a short in time duration oxygen plasma etch. Oxygen plasma removes any organic materials, such as residual photoresist that may be left in the exposed regions where the photoresist is to be removed and the gold is to be located.

Prior to the deposition of the gold, a thin-film layer of chromium (not shown) that can be 200 Angstroms in thickness is deposited using physical vapor deposition (PVD), specifically evaporation. The chromium layer serves as an adhesion layer for the gold and is well known in the art.

A gold thin-film 807 layer is then deposited using a (PVD) process such as evaporation. The thickness of the gold 807 can be 2 microns.

Figure 6D:
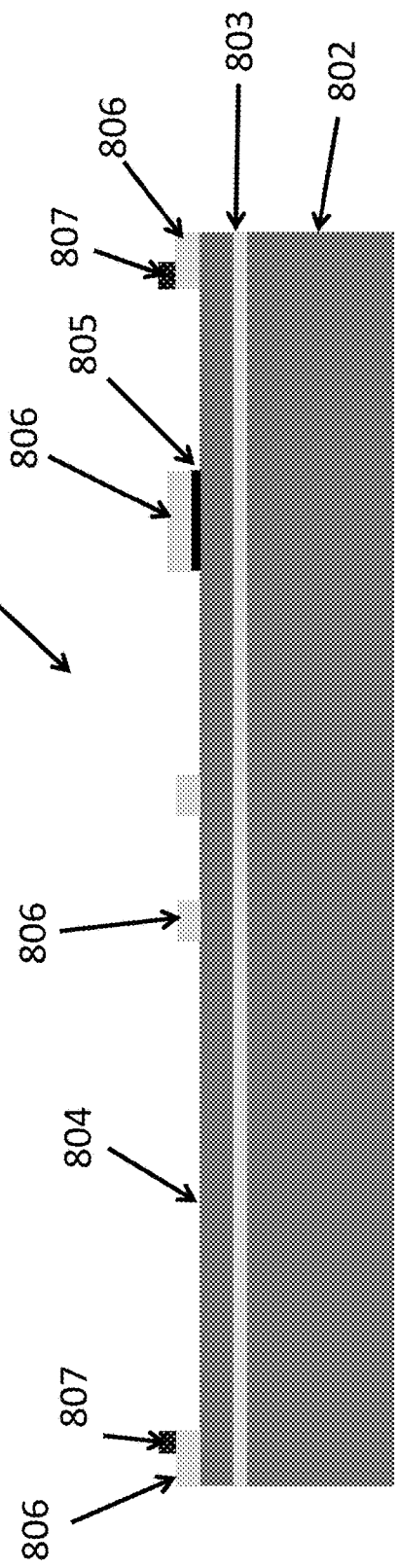

Lift-off process is then performed to pattern the gold layer. This process entails immersion of the substrate into a solvent solution, such as PRS 3000 thereby removing the photoresist layer with gold 807 on top, but leaving the gold 807 that is deposited in areas not on the photoresist. The result is shown in FIG. 6D.

Subsequently, the SOI substrate 801 then has photolithography (mask 4) performed on the back-side of the SOI substrate 801. The photoresist thickness (not shown) can be 10 microns, however other thicknesses can be used. The photolithography process performed is similar to the photolithography processes performed above except in this case, the mask used to transfer the pattern to the photoresist on the backside of the substrate 801 must align mask 4 features to the features on the front side of the substrate, specifically the silicon nitride 805, SiON 806, and/or the gold 807. A special mask aligner is used for this process that allows front-to-back alignment.

Figure 6E:
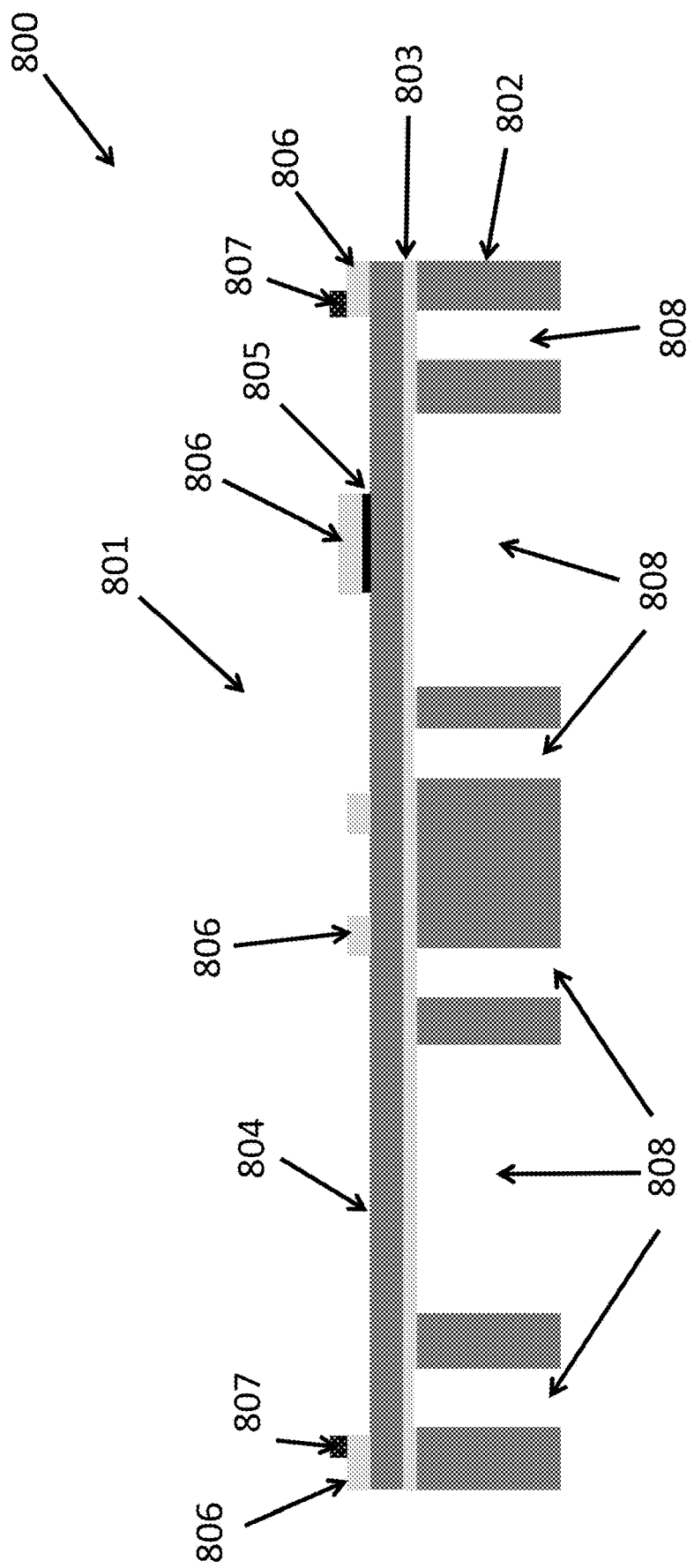

A deep, reactive ion etch (DRIE) is then performed on the backside of the substrate 801 with the photoresist acting as a masking layer for the DRIE etch. The DRIE etch is well known in the art and is a high-aspect ratio type of etch that is performed completely through the handle wafer (substrate 802) of the SOI substrate 801, stopping on the buried oxide layer 803. After the DRIE is completed, the photoresist is then removed and the result is shown in FIG. 6(e).

Figure 6F:
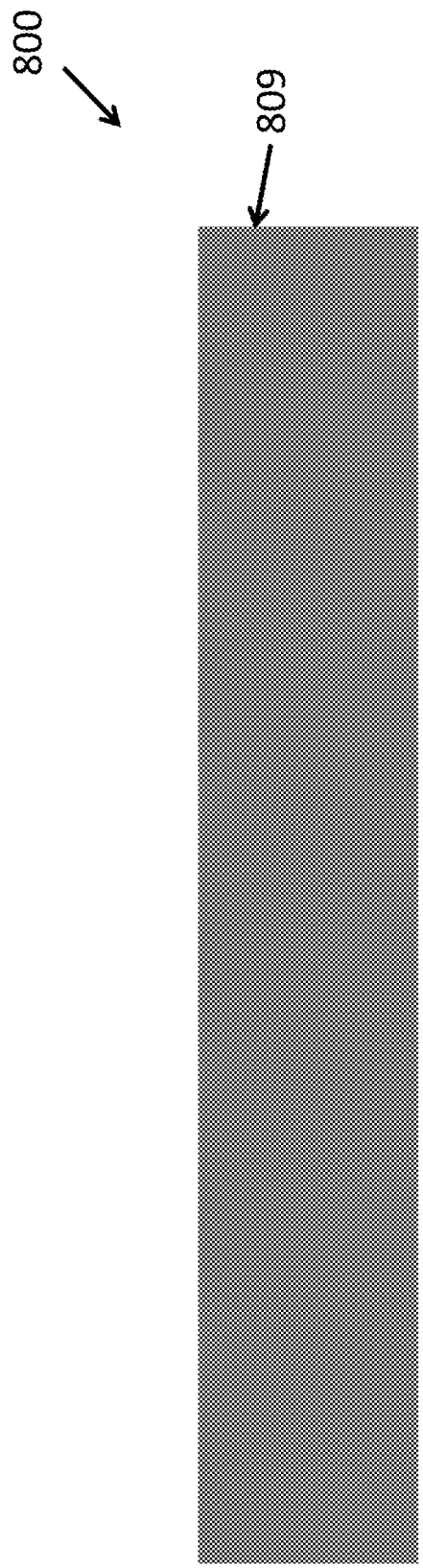

A second substrate 809 is processed for the device fabrication as shown in FIG. 6(f). This substrate 809 is made of single-crystal silicon is double-side polished.

A thin-film layer of SiON 810 is then deposited using PECVD onto the surface of the second substrate 809. The deposited SiON 810 on the second substrate 809 has a thickness of 2 microns in one example, although other thicknesses can be used. The process parameters for the SiON 810 layer on the second substrate 809 are the same as used on the SOI substrate 801 as defined above.

Then a contact photolithography is performed (mask 5) on the surface of the SiON 810 layer on the second substrate 809 wherein the photoresist can be 3 microns in thickness. Other thicknesses of photoresist can be used. Contact photolithography is similar to those already performed. The mask 5 is aligned to the substrate 809 flat. The patterned photoresist is to be used to pattern the SiON 810 layer.

A RIE etch is then performed on the exposed regions (i.e., those not protected by the patterned photoresist layer just completed using photolithography to implement a masking layer) of the SiON 810 layer on the second substrate 809 wherein the etch is terminated when the exposed areas of the SiON 810 are completely removed and the etch has reached the top surface of the second substrate 809. It is noted that smaller features of SiON are made that will act as part of a sealing rings or surfaces 810a for the normally-closed component of the microvalve.

Figure 6G:
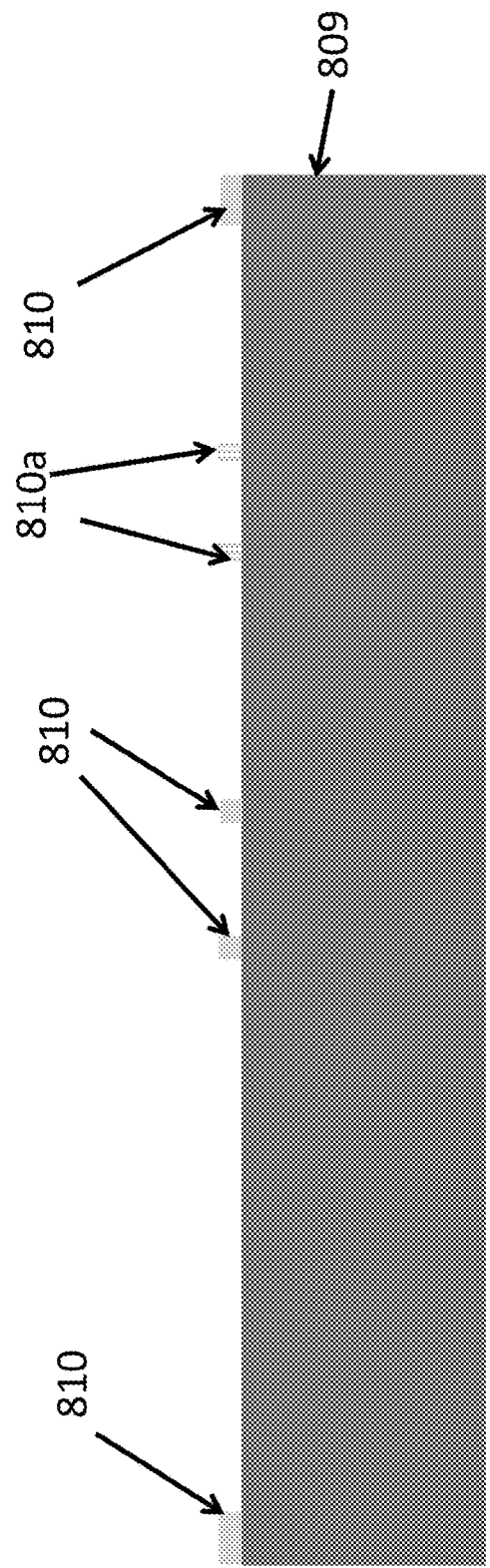

The photoresist masking layer remaining on the surface of the SiON 810 and 810a layer on the second substrate 809 is then removed and the result is shown in FIG. 6(g).

Next, a photolithography is performed (mask 6) on the surface of the second substrate 809 wherein the photoresist can be 7 microns in thickness. Other thicknesses of photoresist can be used. The photoresist is to be used for a lift-off patterning of a gold thin-film layer that will be subsequently deposited. The mask is aligned to the features of the SiON 810 layer.

Prior to depositing a gold thin-film layer, the exposed surfaces of the second substrate 809 are cleaned of any residues using a photoresist descum process that is composed of a short in time duration oxygen plasma etch. Oxygen plasma removes any organic materials, such as photoresist that may be left in the exposed regions of the surface of the second substrate 809 where the gold is to be located.

Prior to the deposition of the gold, a thin-film layer of chromium (not shown) that can be 200 Angstroms in thickness is deposited using physical vapor deposition (PVD), specifically evaporation. The chromium layer serves as an adhesion layer for the gold thin-film layer and is well known in the art.

A gold thin-film 811 layer is then deposited using a (PVD) process such as evaporation. The thickness of the deposited thin-film gold 811 layer can be 2 microns.

Lift-off process is then performed to pattern the deposited gold 811 layer. This process entails immersion of the substrate into a solvent solution, such as PRS 3000 thereby removing the photoresist layer with gold 811 on top, but leaving the gold 811 that is deposited in areas not on the photoresist. The result is shown in FIG. 6H.

A photolithography (mask 7) is performed on the surface of the second substrate 809. The thickness of the photoresist layer patterned using photolithography on the surface of the second substrate can be 3.1 microns. However, other thicknesses of photoresist can be used. The mask for patterning the photoresist is aligned to the SiON 810 and gold 811 layers.

A deep reactive-ion etch (DRIE) is then performed on the exposed regions of silicon on the surface of the second substrate 809. The depth of the etch can be 20 microns to form features (e.g., microvalve chambers 812) into the surface of the substrate 809. The photoresist is then removed and the result is shown in FIG. 6I. It should be noted that the DRIE etch is used to form high-aspect ratio structures 812a, that with the patterned SiON (surfaces 810a) will function as the sealing rings or surfaces 810a and 812a of the normally-closed component of the microvalve.

Figure 6J:
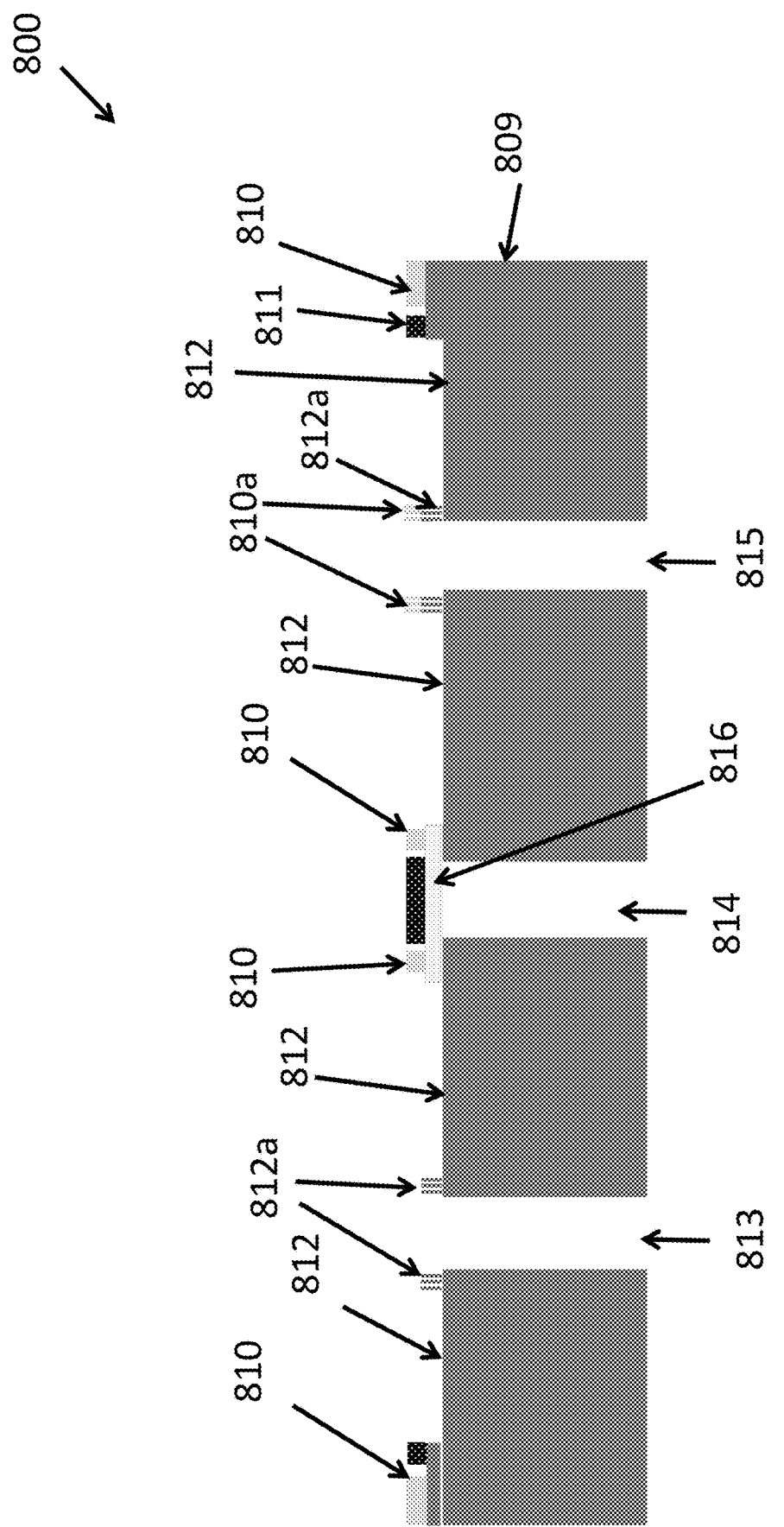

The 20 micron deep DRIE etch performed on the second substrate 809 front side is used to make the microvalve chambers 812 and the microchannel connecting the two valve chambers 816 shown in cross section in FIG. 6J. Other depths can be used for the deep DRIE etch.

Figure 7:
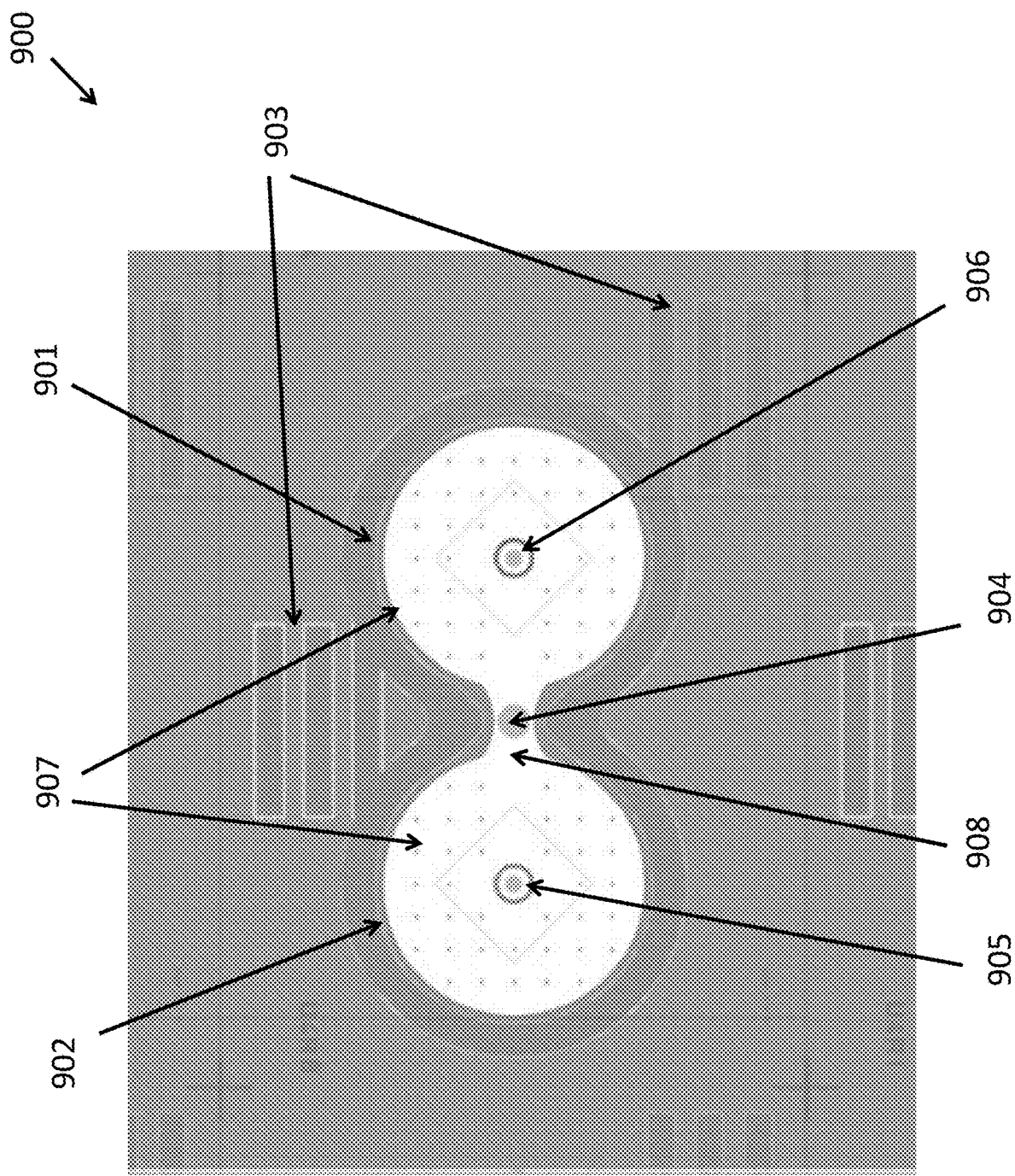
FIG. 7 is a plan view of the microvalve die showing the channel that connects the first and second chambers of the microvalve device.

This is more clearly illustrated in FIG. 7, which is a plan view of the microvalve device die embodiment showing the microvalve 900 chambers 907 and connecting microchannel 908 fluid pathway. The normally-closed component 901 of the microvalve 900 is shown on the right and the normally-open component 902 is shown on the left. The placement locations of the two electrically-active stacked piezoelectric actuators 903 are shown on either side of the normally-closed component 901 of the microvalve 900. The implementation of the microvalve 900 fluidic chambers 907 using the 20 micron deep DREI etch is shown along with the connecting microchannel 908 between the two microvalve chambers 907.

The normally-closed component 901 of the microvalve 900 has a fluidic inlet (or outlet) port 906 is shown at the center of the fluidic chamber 907 on the right. This port 906 is performed using the backside through second substrate 809 etch using DRIE.

Similarly, the normally-open component 902 of the microvalve 900 has a fluidic inlet (or outlet) post 905 shown at the center of the fluidic chamber 907 on the left. There is an outlet (or inlet) port 904 at the center of microchannel 908 connecting the two microvalve 900 chambers 907.

A photolithography (mask 8) is then performed on the back side of the second substrate 809 thereby exposing desired regions of the backside surface of silicon on the second substrate 809. This photolithography entails a front-to-backside alignment capability and the mask on the backside is aligned to features made on the frontside in the SiON 810, gold 811, and/or the frontside DRIE 812.

The front side of the second substrate is then mounted (not shown) using cool grease (i.e., AIT cool grease 7016) to a handle substrate wherein the cool grease acts as a thermal conductive layer between the second substrate 809 and the handle substrate during a subsequent DRIE etch. This is necessary since the DRIE etch to be performed will be performed entirely through the second substrate 809 and if the second substrate is not mounted to a handle substrate the Helium backside cooling compliance during the DRIE etch will be compromised and the etch cannot proceed to completion. The thickness of the cool grease layer to mount the second substrate 809 to the handle substrate can be 4 to 6 microns although other thicknesses can be used.

A DRIE etch is then performed on the backside of the second substrate 809 on the exposed regions of the silicon surface not protected by the patterned masking layer of photoresist. The DRIE etch is completely through the thickness of the second substrate 809. After the DRIE etch is complete, the masking layer of photoresist on the backside of the second substrate surface is removed. The mounted handle substrate is then separated from the front side of the second substrate 809 using an immersion in isopropyl alcohol. The cross section of the second substrate 809 at this stage of the process sequence is shown in FIG. 6J showing the through substrate 809 features (e.g., ports 813, 814, and 815) made in the backside of the substrate 809.

Figure 6K:
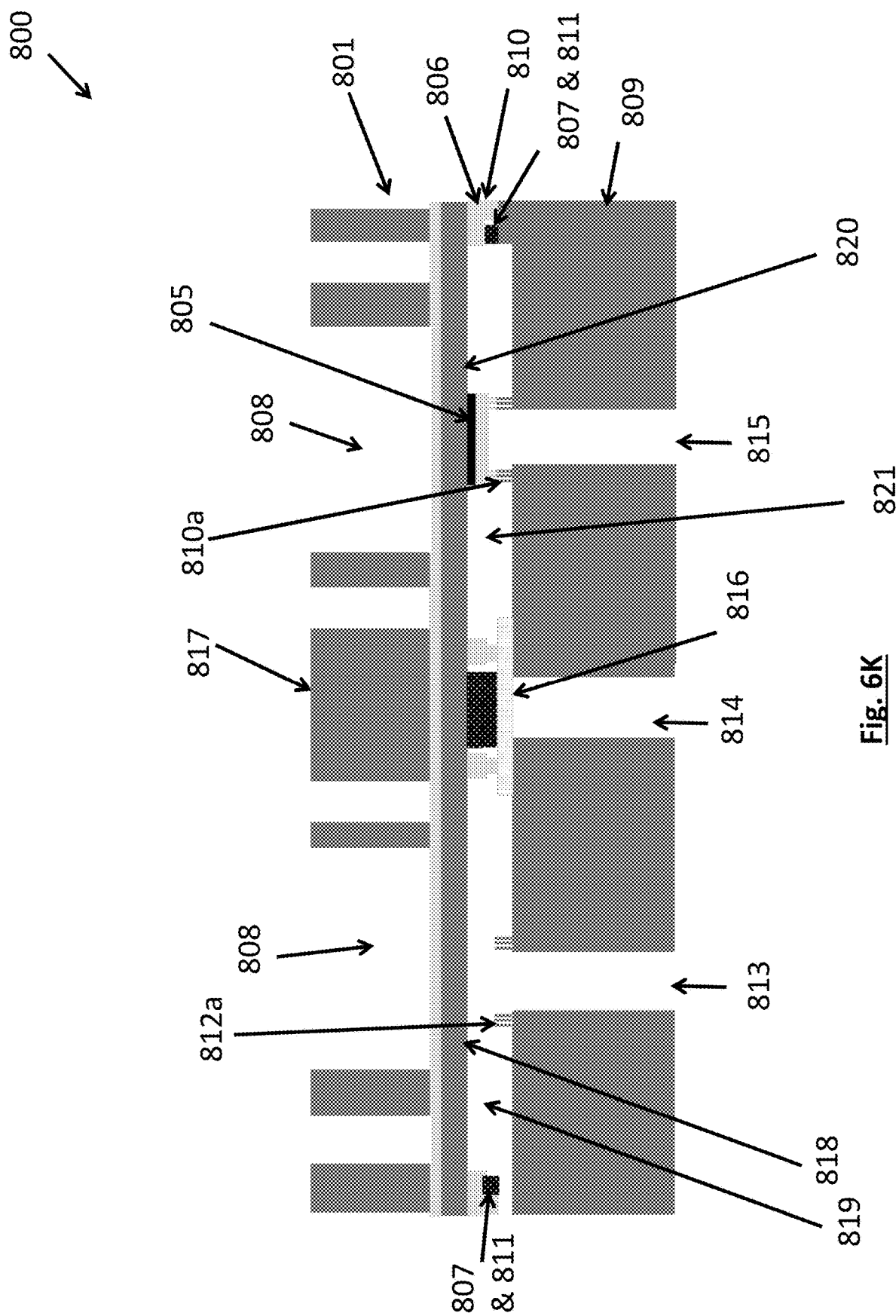

The second substrate 809 then has its front side bonded to the top surface of the first substrate 801. The bonding process performed is a thermo-compression bonding wherein the features made into the two substrates 801 and 809 are aligned to one another and then the substrates 801 and 809 are physically contacted to one another, followed by the application of a bonding force (or pressure) and an elevated temperature. The applied bonding force (or pressure) and elevated temperature cause a physical-chemical bonding to take place between the surfaces of the two bonded substrates 801 and 809 as shown in FIG. 6K.

Next, the stacked piezoelectric actuators 823 and a spacer element 825 are attached to the open areas on the backside of the first substrate 801 as shown in FIG. 6(1). The stacked piezoelectric actuators 823 and spacer element 825 are made externally and the stacked piezoelectric actuators 823 already have the electrodes on the top and bottom surfaces of the stacked piezoelectric actuator 823 elements. Therefore, the stacked piezoelectric actuators 823 can be simply attached to the backside surface in the pre-defined open areas using an epoxy 822. The spacer element 825 can also be simply attached to the backside surface in the pre-defined open areas using an epoxy 824.

Alternatively, electrodes can be made on the surfaces of the open areas of where the electrodes are to be located during the fabrication process.

Figure 6L:
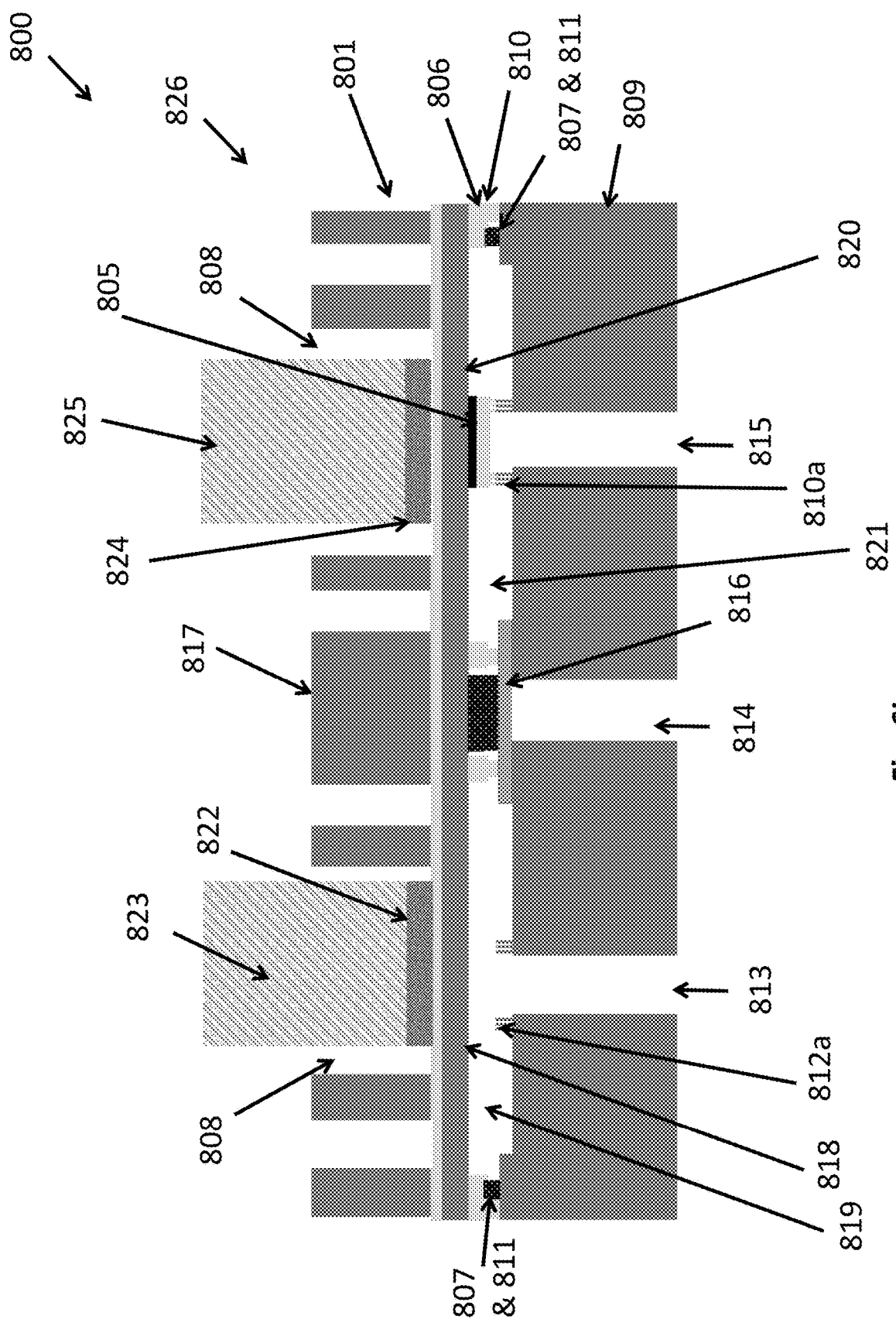

The completed microvalve 826 shown in FIG. 6L has the normally-open component on the left and the normally-closed component on the right. The normally-open component of the microvalve 826 shown on the left has a mechanically compliant membrane 818 that can be deflected downwards to physically contact the sealing rings or surfaces 812a around the inlet (or outlet) fluid port 813. The membrane 818 is deflected downward by the stacked piezoelectric actuator 823. The normally-open component of the microvalve 826 has a circularly-symmetric chamber 819 that the fluid can pass through when the valve is open to the flow of fluid.

The normally-closed component of the microvalve 826 shown on the right has a mechanically compliant membrane 820 that has a patterned layer of SiON 806 and silicon nitride 805 on the bottom surface of the compliant membrane 820 that is in physical contact the sealing rings or surfaces 810a around the inlet (or outlet) fluid port 815. The membrane 820 is deflected upward by spacer element 825 attached to the membrane 820 wherein the spacer element is deflected upwards since it is mechanically attached to a ridge bridge element (not shown) that is mechanically attached to two stacked piezoelectric actuators 823 (not shown). The normally-open component of the microvalve 826 has a circularly-symmetric chamber 821 that the fluid can pass through when the valve is open to the flow of fluid.

There is an outlet (or inlet) fluidic port 814 in the center of the microvalve 826. It is fluidically connected to an open low-flow resistance microchannel 816 made in the bottom substrate 809.

As shown in FIG. 6L, the gold layers 807 and 811 used for the thermocompression bonding between the two substrates 801 and 809 has compressed during the bonding process so that the surfaces of the SiON layers 806 and 810 come into physical contact so as to set the proper spacing between the two substrates 801 and 809.

This can be difficult to achieve in practice since the gold 807 and 811 are not conducive to deforming under reasonable pressures (or forces) and temperatures used for most thermocompression bonding processes.

Therefore, it may be preferable to substitute for the gold 807 and 811 layers some other material or material systems layers. Alternative materials and materials systems that can be used as layers to substitute for the gold 807 and 811 layers include: indium, tin, gold-tin, gold-indium, and benzocyclobutene (BCB). Thin-film layers of indium, tin, gold-tin, and gold-indium can all be deposited using physical vapor deposition (PVD) techniques and patterned using lift-off as described herein. BCB can be spin cast deposited onto the substrate and patterned using a photolithography and etch process (using an oxygen-based) plasma, or directly patterned if a photosensitive BCB is used.

Figure 8:
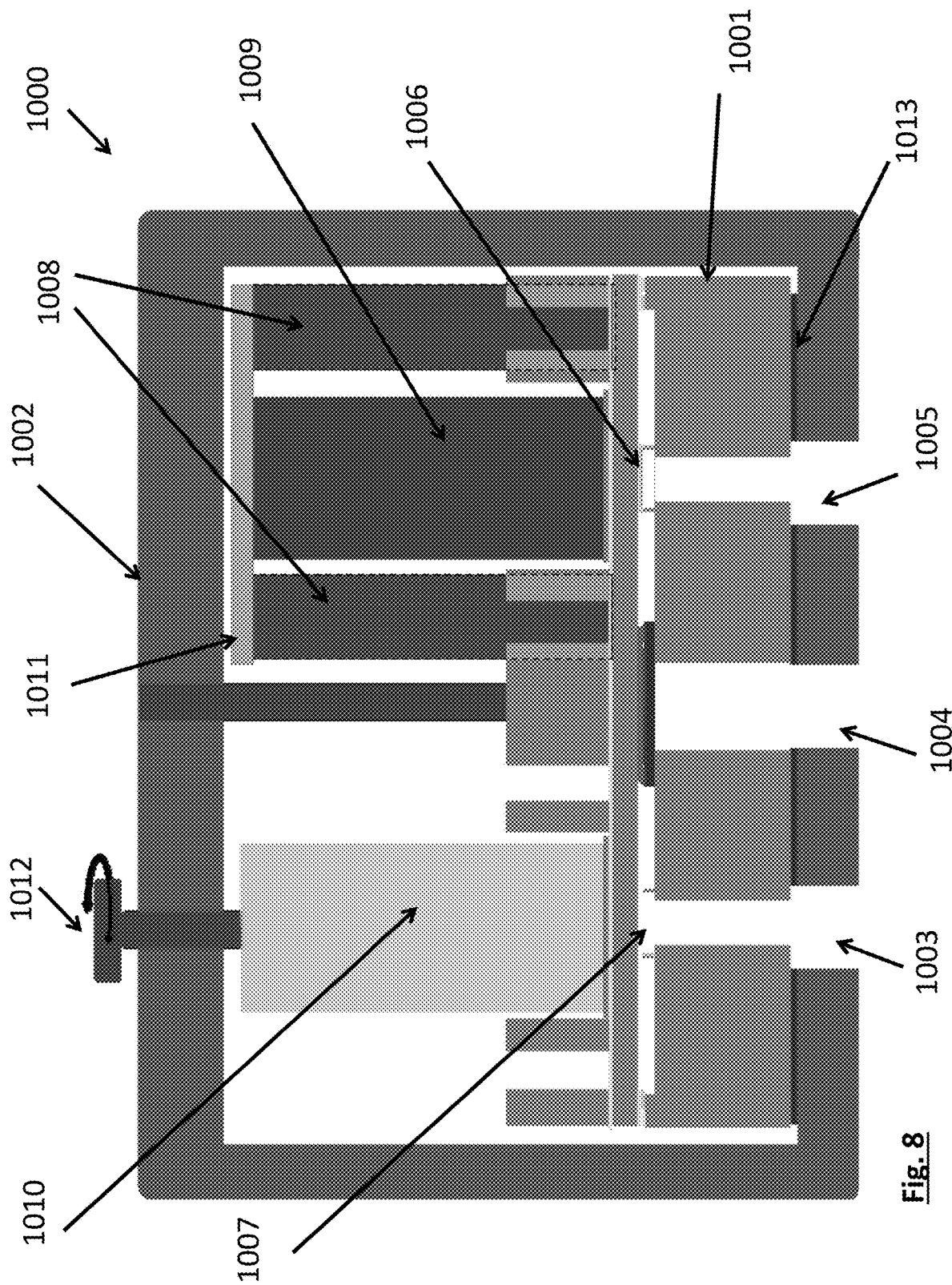
FIG. 8 is a cross section of the microvalve device positioned with a test fixture or package for operation of the device.

The 3-way microvalve requires a suitable test fixture or package in order to demonstrate the device's fluid control functionality. An embodiment 1000 of such a test fixture or package is illustrated in FIG. 8. As shown, the 3-way microvalve 1001 is placed inside of an enclosure 1002 that has 2 inlet (or outlet) ports 1003 and 1005 and one outlet (or inlet) port 1004 wherein these ports fluidically seal 1013 to the ports of the microvalve device. The fluidic sealing 1013 of the microvalve 1001 ports 1003, 1004, and 1005 can be done using an adhesive, gaskets, o-rings, or similar. The normally-closed component 1006 of the microvalve 1001 is shown on the right and the normally-open component 1007 of the microvalve 1001 is shown on the left. The two active stacked piezoelectric actuators 1008 for the normally-closed component 1006 of the microvalve 1001 are shown with dotted lines since they are both located out-of-the-plane of this cross sectional illustration. The center inactive spacer element 1009 for the normally-closed component 1006 of the microvalve 1001 is shown as well. A rigid bridge element 1011 connects the two active stacked piezoelectric actuators 1008 and the spacer element 1009 on the top right side of the normally-closed component 1006 of the microvalve 1001. The active stacked piezoelectric actuator 1010 for the normally-open component 1007 of the microvalve is shown on the left. The stacked piezoelectric actuator 1010 mechanically attached to the normally-open component 1007 of the microvalve 1001 requires a rigid support element to work against in order to close the normally-open component 1007 of the microvalve 1001 and for this purpose a micrometer-turn screw 1012 is used to make physical contact to the top surface of the stacked piezoelectric actuator 1010 for the normally-open component 1007 of the microvalve 1001.

Figure 9:
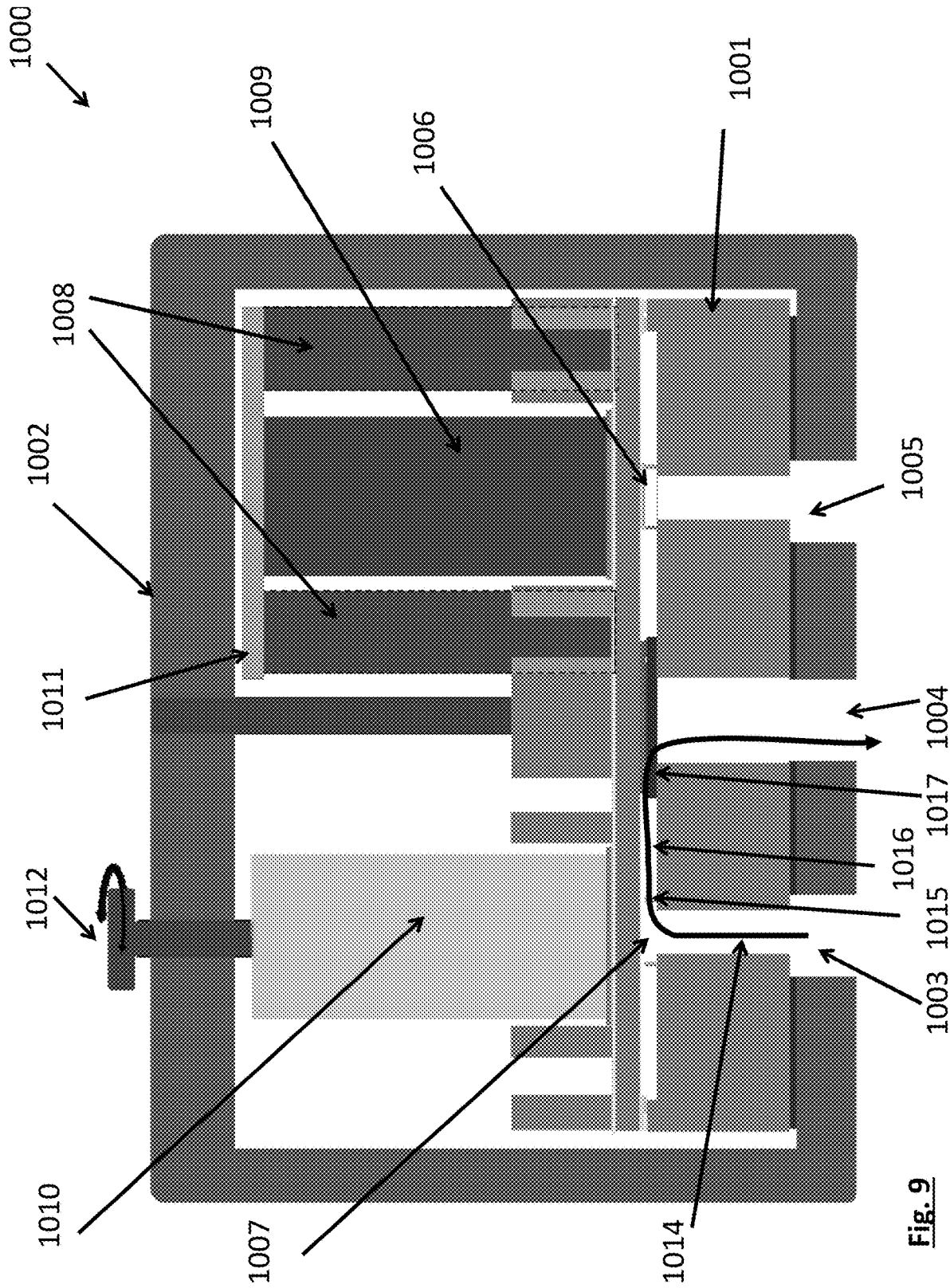
FIG. 9 is a cross section of the microvalve device positioned with a test fixture or package for operation of the device when no voltages are applied to the piezoelectric actuators and the normally-open component of the microvalve is open to the flow to fluids while the normally-closed component of the microvalve is closed to the flow of fluids.

When all of the stacked piezoelectric actuators 1008 and 1010 are inactive (See FIG. 9), that is, no voltage is applied to any of these stacked piezoelectric actuators 1008 and 1010, the normally-closed component 1006 the microvalve 1001 is closed to fluid flow. The normally-open component 1007 of the microvalve 1001 is open to the flow of fluid 1014. As shown in FIG. 9, fluid 1014 enters the inlet port 1003 to the normally-open component 1007 of the microvalve 1001, flows over the sealing rings or surfaces (e.g., seal 1013), through the valve chamber, through the microchannel 1015 connecting the two valve chambers and outward through the microvalve outlet port 1004.

When all of the stacked piezoelectric actuators 1008 and 1010 are active, that is, a sufficient voltage is applied to all of these stacked piezoelectric actuators 1008 and 1010 to cause them to actuate, the normally-open component 1007 of the microvalve 1001 is closed to fluid flow. The actuator 1010 when actuated elongates and generates a force for its elongation. Since the actuator 1010 is held rigid by a screw 1012 at the top, the actuator causes the movable membrane 1022 of the normally-open component 1007 of the microvalve 1001 to deflect downwards whereby the bottom surface of the movable membrane 1022 makes physical contact with the top surfaces of the sealing rings or surfaces 1023 thereby closing the flow of fluid through the normally-open component 1007 of the microvalve 1001.

The normally-closed component 1006 of the microvalve 1001 has actuators 1008 that are actuated and are constrained on the bottom by a rigid base and therefore these actuators 1008 elongate vertically. These actuators 1008 are connected to a rigid bridge element 1011 that causes it to also lift vertically and since the center spacer element 1009 is also connected to the rigid bridge element 1011, the center spacer element 1009 deflects upwards. Since the center spacer element 1009 is physically attached to the movable membrane 1024 of the normally-closed component 1006 of the microvalve, the movable membrane 1024 to taken out of physical contact with the sealing rings or surfaces 1019 of the normally-closed component 1006 of the microvalve thereby causing the normally-closed component 1006 to change to an open state. This allows fluid 1018 to flow into the inlet port 1005 of the normally-closed component 1006 of the microvalve, flow over the sealing rings or surfaces 1019, though the valve chamber 1020, through the microchannel connecting the two valve chambers, and outward through the outlet port 1004.

It should be evident that the 3-way microvalve of the present disclosure can be operated in alternative manners.

For example, as shown in FIG. 9, the flow can be reversed through the device wherein the fluid flows into the center port 1004, through the fluid channel 1017, subsequently through the fluid channel 1016, over the sealing ring(s) 1015 and outward through the port 1003 of the normally-open component 1007 of the microvalve 1001, when the piezoelectric actuators 1008 and 1010 are not actuated with an applied voltage.

Figure 10:
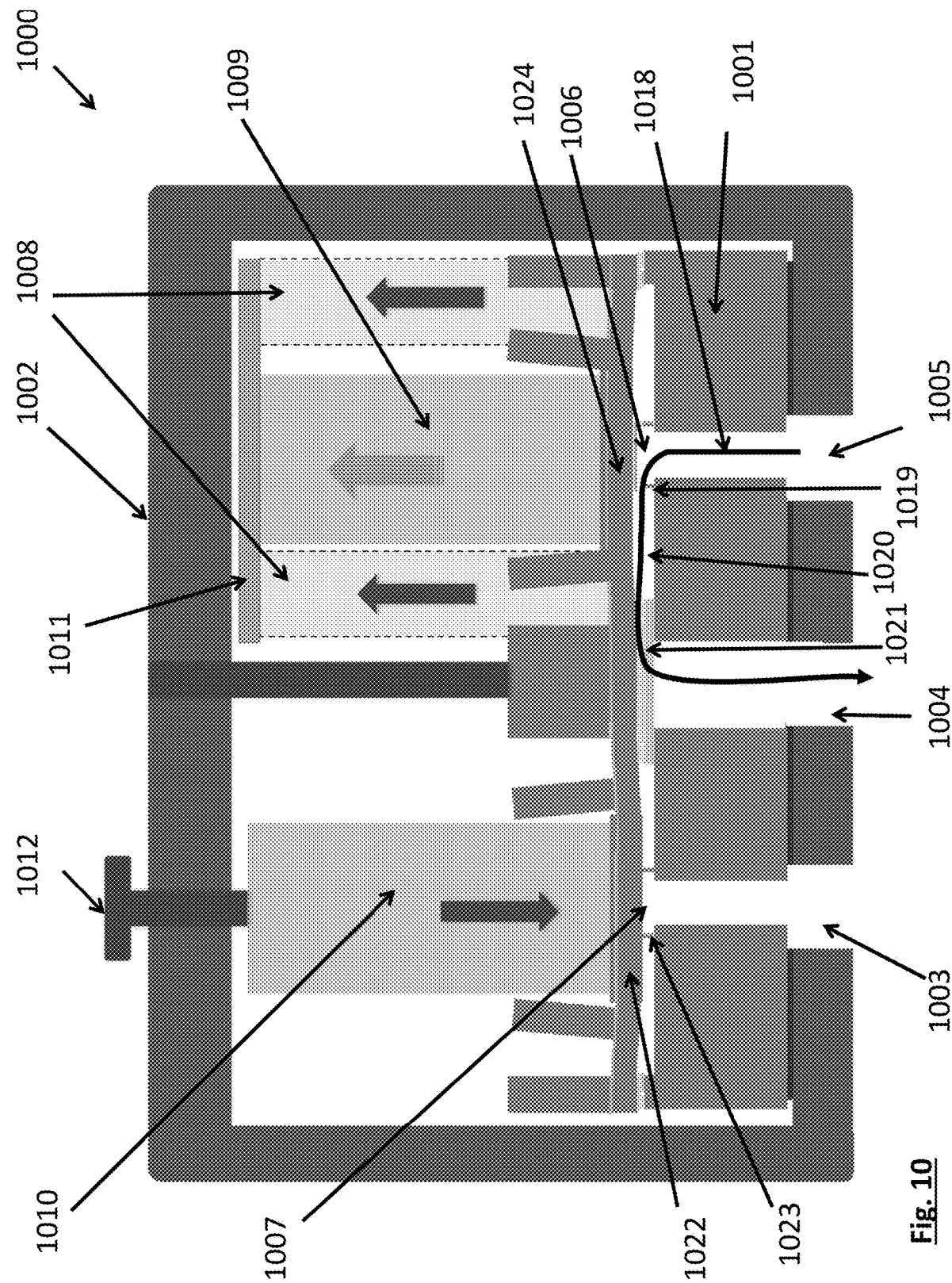
FIG. 10 is a cross section of the microvalve device positioned with a test fixture or package for operation of the device when voltages are applied to the piezoelectric actuators and the normally-open component of the microvalve is closed to the flow to fluids while the normally-closed component of the microvalve is open to the flow of fluids.

Further, as shown in FIG. 10, the flow can be reversed through the device wherein the fluid flows into the center port 1004, through the fluid channel 1021, and further downstream through the fluid channel 1020, across the sealing ring(s) 1019 and outward through the outlet port 1005, when the piezoelectric actuators 1008 and 1010 are actuated with an applied voltage.

Additionally, it is possible to actuate the actuator for one of the microvalve components 1006 and 1007, and not the other to enable other functionalities. For example, the piezoelectric actuator 1010 of the normally-open component 1007 of the microvalve 1001 can be actuated while the piezoelectric actuators 1008 of the normally-closed component 1006 of the microvalve are not actuated, thereby closing all ports in the microvalve to the flow of fluid.

And, the piezoelectric actuators 1008 of the normally-closed component 1006 of the microvalve 1001 can be actuated while the piezoelectric actuator 1010 of the normally-open component 1007 of the microvalve is not actuated, thereby opening all ports in the microvalve to the flow of fluid. This modality can be used to combine the flows from any two ports into the other port.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A 3-way microvalve device comprising:
   a first, second and a third fluidic ports;
   a first piezoelectric actuator;
   a second piezoelectric actuator;
   a spacer attached to a first movable membrane of a pre-determined thickness positioned over the first fluidic port between the first and second piezoelectric actuators, wherein the movable membrane is in physical contact with sealing rings located around a perimeter of the first fluidic port forming a normally-closed component of the microvalve;

a third piezoelectric actuator attached to a second movable membrane of a pre-determined thickness positioned over the second fluidic port wherein the second movable membrane is not in physical contact with sealing rings located around the perimeter of the second fluidic port forming a normally-open component of the microvalve; and a fluid flow channel connecting the third fluidic port, the normally-open and normally-closed components of the microvalve, wherein the first, second and third piezoelectric actuators are configured to generate applied forces to open and close one or more of the first, second and third fluidic ports to the flow of fluids through the microvalve.

2. The microvalve device of claim 1, wherein the microvalve includes two inlet ports and one outlet port.

3. The microvalve device of claim 1, wherein the microvalve includes one inlet port and two outlet ports.

4. The microvalve device of claim 1, wherein the first and/or the second membrane is configured to physically contact and close off one or more of the first, second and third ports of the microvalve to the flow of fluid.

5. The microvalve device of claim 1, wherein the microvalve further comprises sealing rings around the periphery of the first, second and third fluid ports.

6. The microvalve device of claim 1, wherein the first, second and third actuators are stacked piezoelectric actuators that can generate displacements of 2 to 5 microns and/or control fluid pressure more than two psi.

7. The microvalve device of claim 1, wherein the microvalve is positioned within a fixture having three fluidic ports that connect to the first, second and third ports of the microvalve and at least two electrical connections to the microvalve.

8. The microvalve device of claim 1, wherein the microvalve is positioned within a package having three fluidic ports that connect to the first, second and third ports of the microvalve.

9. The microvalve device of claim 7, wherein the fixture is made of metal, ceramic and/or plastic materials.

10. The microvalve device of claim 8 wherein the package is made of metal, ceramic and/or plastic materials.

11. The microvalve device of claim 1, wherein the microvalve has a displacement between sealing surfaces and the first and/or the second membrane of 10 microns or less.

12. The microvalve device of claim 1, wherein the microvalve has a displacement between sealing surfaces and the first and/or the second membrane of more than 10 microns.

13. The microvalve device of claim 1, wherein the microvalve is configured to control fluids at pressures of 300 pounds-per-square inch or less.

14. The microvalve device of claim 1, wherein the microvalve is configured to control fluids at pressures of more than 300 pounds-per-square inch.

15. A three-way microvalve device comprising: two major components wherein a first component of the two major components is a normally-open microvalve and a second component of the two major components is a normally-closed microvalve connected to a common fluid flow channel that comprises a fluidic port and wherein the normally-closed component of the microvalve comprises a first and second piezoelectric actuators and a spacer element that are attached to a rigid bridge element on one side of the first and second actuators and the spacer.

16. The microvalve of claim 15, wherein the other side of the first and second actuators are attached to a rigid platform, and the spacer is attached to a movable membrane that is configured to open and close the microvalve.

17. The microvalve of claim 16, wherein the normally-open component of the microvalve comprises one piezoelectric actuator that it held rigid at one end and the other end is attached to a movable membrane that is configured to close and open the microvalve.

18. The microvalve of claim 15, wherein the normally-closed and normally-open components of the microvalve are connected to the common fluidic channel configured to allow fluid to pass between the normally-closed and normally-open components of the microvalve.

19. The microvalve of claim 15, wherein the common fluidic channel comprises a fluidic port.

20. The microvalve of claim 16, wherein the movable membrane of the normally-closed component of the microvalve is in physical contact with sealing rings or surfaces positioned around the perimeter of a fluidic port.

21. The microvalve of claim 17, wherein the movable membrane of the normally-open component of the microvalve is not in physical contact with sealing rings or surfaces positioned around the perimeter of a fluidic port.

22. The microvalve device of claim 16, wherein the microvalve has a displacement between sealing surfaces and the membrane of 10 microns or less.

23. The microvalve device of claim 16, wherein the microvalve has a displacement between sealing surfaces and the membrane of more than 10 microns.

24. The microvalve device of claim 15, wherein the microvalve is configured to control fluids at pressures of 300 pounds-per-square inch or less.

25. The microvalve device of claim 16, wherein the microvalve is configured to control fluids at pressures of more than 300 pounds-per-square inch.

26. A method for fabrication of a three-way microvalve device comprising:

bonding first and a second pre-processed substrates, wherein one of the pre-processed substrates is a silicon-on-insulator (SOI) type of substrate and the first and second pre-processed substrates have pre-determined sized flow channels, and providing a mechanical mechanism between the first and a second pre-processed substrates, the mechanical mechanism including multiple piezoelectric actuators and a spacer element that are attached to a rigid bridge element on one side of the multiple piezoelectric actuators and the spacer configured to open and close the device to the flow of fluids through the three-way microvalve device, and pre-determined sized inlet and outlet ports that are made into the first and a second pre-processed substrates prior to the first and a second pre-processed substrates being bonded to one another.

27. The method for fabrication of a three-way microvalve device claim 26, wherein the flow channels, and inlet and outlet ports, are made using deep, reactive ion etching (DRIE) methods.

28. The method for fabrication of a three-way microvalve device of claim 26, wherein the inlet and outlet ports include two inlet ports and one outlet port that are in fluidic connection to the internal flow pathways in the microvalve.

29. The method for fabrication of a three-way microvalve device of claim 26, wherein the substrates are bonded using thermocompression bonding.

30. The method for fabrication of a three-way microvalve device of claim 26, wherein the substrates are bonded using thermocompression bonding and an intermediary layer of either gold, gold and tin, gold and indium, indium, or benzocyclobutene.

31. The method for fabrication of a three-way microvalve device of claim 26, wherein the substrates are bonded using thermocompression bonding and an intermediary of solder paste.

32. The method for fabrication of a three-way microvalve device of claim 26, wherein the substrates are bonded using thermocompression bonding and an intermediary layer of polymer.

33. The method for fabrication of a three-way microvalve device of claim 26, wherein a thin, mechanically compliant membrane located approximately in the middle of the flow channels is configured to be deflected by an attached piezoelectric actuator to open and close the inlet and outlet ports of the microvalve.

34. The method of fabrication of a three-way microvalve device of claim 26, wherein the microvalve is actuated using a piezoelectric actuator.

35. The method of fabrication of a three-way microvalve device of claim 34, wherein the piezoelectric actuator is a piezoelectric actuator stack to obtain larger displacements and stroke of the microvalve thereby reducing flow resistances.

36. The method of fabrication of a three-way microvalve device of claim 26, wherein sealing rings are fabricated around the inlet and outlet ports to reduce flow resistance and stiction effects.

37. The method for fabrication of a three-way microvalve device of claim 36, wherein the sealing rings are made using deep, reactive ion etching (DRIE) of silicon.

38. The method for fabrication of a three-way microvalve device of claim 33, wherein the membrane layer thickness and thereby the mechanical compliance is accurately controlled using the device layer of a single-on-insulator (SOI) wafer.

39. The method for fabrication of a three-way microvalve device of claim 33, wherein one or more material layers are made to strain-bias the membrane resulting in a normally-closed microvalve configuration.

40. The method for fabrication of a three-way microvalve device of claim 26, wherein the one or more of the substrates are made of silicon.

41. The method for fabrication of a three-way microvalve device of claim 26, wherein the substrates are made from glass, metal, semiconductor, or a ceramic, of some combination thereof.

42. A three-way microvalve device comprising:
a first fluid chamber including a first fluid port;
a second fluid chamber including a second fluid port;
a fluid channel connecting the first and second fluid chambers that includes a third fluid port;
a first fluid sealing surface provided around an opening of the first fluid port protruding from a bottom of a first surface of the first fluid chamber;
a second fluid sealing surface provided around an opening of the second fluid port protruding from a bottom of a second surface of the second fluid chamber;
a first membrane disposed in the first fluid chamber fixed to sidewalls of the first fluid chamber and in physical contact with the first fluid sealing surface;
a second membrane disposed at a top of the second fluid chamber fixed to sidewalls of the second fluid chamber and not in physical contact with the second fluid sealing surface;
a first mechanism comprising a first and a second piezoelectric actuator and a spacer element that are mechanically coupled to the first membrane whereupon the application of an electrically applied signal to the first and second piezoelectric actuators of the normally-closed first component of the microvalve results in a change of state from closed to open to the flow of fluid through the microvalve; and
a second mechanism composed of a third piezoelectric actuator coupled to the second membrane that upon application of an electrically applied signal to the third piezoelectric actuator of the normally-open first component of the microvalve results in a change state from open to closed to the flow of fluids through the microvalve.

43. The three-way microvalve device of claim 42, wherein the first and second piezoelectric actuators are both held rigid at their bases and positioned outside the perimeter of the first membrane, and the spacer element is attached by its base to a center of the first membrane, and the first and second piezoelectric actuators and the spacer element are attached to a rigid bridge element at their tops.

44. The three-way microvalve device of claim 43, wherein the first and second piezoelectric actuators of the first mechanism are configured to elongate upon application of an electrical signal thereby forcing the rigid bridge element to displace in the vertical direction and pulling the spacer element upwards by the same dimensional amount resulting in the first membrane to be pulled upwards by the amount of elongation of the first and second piezoelectric actuators to change the state of the normally-closed component of the microvalve from closed to open to the flow of fluids through the microvalve.

45. The three-way microvalve device of claim 44, wherein the first mechanism changes its state from open to closed to the flow of fluids though the microvalve upon the electrical signal being turned off.

46. The three-way microvalve device of claim 42, wherein the second mechanism of the normally-open component of the microvalve is comprised of a third piezoelectric actuator attached by its base to the center of the second membrane and the top is held rigid.

47. The three-way microvalve device of claim 46, wherein the third piezoelectric actuator is configured to elongate based on an electrically applied signed thereby resulting in the second membrane to be pushed downwards by the amount of elongation of the third piezoelectric actuator to change the state of the normally-open component of the microvalve from open to closed to the flow of fluids through the microvalve.

48. The three-way microvalve device of claim 47, wherein the second mechanism changes its state from closed to open to the flow of fluids through the microvalve upon the electrical signal being turned off.

49. The microvalve device of claim 42, wherein the microvalve is configured to provide a displacement between the sealing surfaces and the first and/or second membrane of 10 microns or less.

50. The microvalve device of claim 42, wherein the microvalve is configured to provide a displacement between the sealing surfaces and the membrane of more than 10 microns.

51. The microvalve device of claim 42, wherein the microvalve is configured to control fluids at pressures of 300 pounds-per-square inch or less.

52. The microvalve device of claim 42, wherein the microvalve is configured to control fluids at pressures of more than 300 pounds-per-square inch.

* * * * *